(12) United States Patent
Shimizu et al.

(10) Patent No.: US 7,383,505 B2
(45) Date of Patent: Jun. 3, 2008

(54) INFORMATION SHARING DEVICE AND INFORMATION SHARING METHOD

(75) Inventors: Seiya Shimizu, Kawasaki (JP); Asako Kitaura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 10/955,599

(22) Filed: Sep. 30, 2004

(65) Prior Publication Data
US 2005/0223315 A1 Oct. 6, 2005

(30) Foreign Application Priority Data
Mar. 31, 2004 (JP) ............... 2004-107482

(51) Int. Cl.
G06F 17/21 (2006.01)
(52) U.S. Cl. .................................... 715/512
(58) Field of Classification Search ................ 715/512
See application file for complete search history.

(56) References Cited

U.S. PATENT DOCUMENTS

| 6,484,156 B1 * | 11/2002 | Gupta et al. ............... 707/1 |
| 2005/0091578 A1 * | 4/2005 | Madan et al. ............. 715/512 |

FOREIGN PATENT DOCUMENTS

| JP | 6-274493 | 9/1994 |
| JP | 08-235231 | 9/1996 |
| JP | 09-231040 | 9/1997 |
| JP | 10-214022 | 8/1998 |
| JP | 2001-228789 | 8/2001 |
| JP | 2002-108897 | 4/2002 |
| JP | 2002-132129 | 5/2002 |
| JP | 2002-132131 | 5/2002 |
| JP | 2002-132965 | 5/2002 |

OTHER PUBLICATIONS

Experiments made in Yachiyo-city. Research Institute for System Science NTT Data Corporation http://www.riss-net.jp/edemo/yachiyo.html.

* cited by examiner

Primary Examiner—Doug Hutton
(74) Attorney, Agent, or Firm—Katten Muchin Rosenman LLP

(57) ABSTRACT

A technique is provided which enables users to add, with ease, annotation information to an electronic document on a network and to share the annotation information within a disclosure range set to the annotation information. An electronic information is provided in a state that allows the electronic information to have annotation in formation attached, annotation information to be attached to the electronic information is stored, attribute information indicating the disclosure range of the annotation information is stored and, when a user requests to provide annotation information, annotation information available to the user is provided to a terminal of the user by consulting the attribute information.

29 Claims, 34 Drawing Sheets

FIG. 8

| □ TEXT | □ ×××  □ ××× □ ××× □ ××× |
|---|---|

TITLE: ABOUT FACTOR
CREATOR: TANAKA
ELECTRONIC STICKY NOTE CONTENTS: EXPLANATION ▽ | LEVEL OF IMPORTANCE: NORMAL ▽
SPECIFY ELECTRONIC STICKY NOTE COLOR: ○ □
TANAKA ABOUT FACTOR
QUOTATION
VALID FOR [7] DAYS
COMMENT: ◁ DEPENDING ON WHICH FACTOR IS TAKEN······ ▷

OK    CANCEL

LIST OF RELATED ELECTRONIC STICKY NOTES

⊙ DISPLAY IN TREE FORMAT  ○ DISPLAY IN REVERSE CHRONOLOGICAL ORDER  ○ DISPLAY IN CHRONOLOGICAL ORDER

* 2003/12/02. 20:03:30 [TANAKA] SYSTEM BUILDING
  - 2003/12/03. 14:02:25 [IKEDA] Re. SYSTEM BUILDING
    - 2003/12/03. 14:04:21 [TANAKA] Re. Re. SYSTEM BUILDING
  - 2003/12/03. 14:05:02 [TANAKA] Re. SYSTEM BUILDING
- 2003/12/02. 20:07:15 [TANAKA] Re. SYSTEM BUILDING

FIG. 16

LIST OF RELATED ELECTRONIC STICKY NOTES

⊙ DISPLAY IN TREE FORMAT  ○ DISPLAY IN REVERSE CHRONOLOGICAL ORDER  ○ DISPLAY IN CHRONOLOGICAL ORDER

- 2003/12/02, 20:03:30 [TANAKA] SYSTEM BUILDING
  - 2003/12/03, 9:00:30 [IKEDA] Re. SYSTEM BUILDING
    - 2003/11/30, 14:00:28 [YAMADA] QUESTION !
- 2003/11/15, 20:00:01 [SHIMIZU] OBJECTION

ANALYZE

CLOSE

FIG. 27

| MANAGEMENT ITEM | DESCRIPTION | USER1 | USER2 | ... |
|---|---|---|---|---|
| USER_ID | LOGIN ID | IKEDA | TANAKA | |
| USER_PASSWORD | LOGIN PASSWORD | ikeike555 | abc123 | |
| USER_NAME | USER NAME DISPLAYED ON ELECTRONIC STICKY NOTE | IKEDA | TANAKA | |
| USER_TYPE | USER TYPE (E.G., 0: SYSTEM ADMINISTRATOR, 1: TEACHER, 2: STUDENT) | 1 | 2 | |
| COMMENT | USER DESCRIPTION | PROFESSOR OF ENGINEERING DEPARTMENT | STUDENT NUMBER: XXXXXX | |
| MAIL_ADD | E-MAIL ADDRESS | ikeda@fjxx.com | tanaka@fxxx.com | |

FIG. 28

| MANAGEMENT ITEM | DESCRIPTION | GROUP 1 | GROUP 2 | ... |
|---|---|---|---|---|
| GROUP_ID | GROUP ID | G1 | G2 | |
| GROUP_NAME | GROUP NAME | INTORDUCTION TO INFORMATION PROCESSING | STATISTICS COURSE | |
| COMMENT | GROUP DESCRIPTION | UNDER THE GUIDANCE OF PROFESSOR IKEDA... | FROM THE BASICS OF STATISTICS... | |

FIG. 29

| MANAGEMENT ITEM | DESCRIPTION | MEMBER INFORMATION 1 | MEMBER INFORMATION 2 | MEMBER INFORMATION 3 | ... |
|---|---|---|---|---|---|
| GROUP_ID | GROUP ID (SEE TABLE 2) | G1 | G1 | G2 | |
| USER_ID | LOGIN ID OF USER BELONGING TO THE GROUP (SEE TABLE 1) | ikeda | tanaka | tanaka | |

FIG. 30A

| MANAGEMENT ITEM | DESCRIPTION | ELECTRONIC STICKY NOTE1 | ELECTRONIC STICKY NOTE2 | ELECTRONIC STICKY NOTE3 |
|---|---|---|---|---|
| TAG_ID | ELECTRONIC STICKY NOTE ID | F1 | F2 | F3 |
| USER_ID | LOGIN ID OF USER WHO HAS CREATED THE ELECTRONIC STICKY NOTE (SEE TABLE1) | TANAKA | IKEDA | TANAKA |
| PAGE_URL | URL OF DOCUMENT TO WHICH ELECTRONIC STICKY NOTE IS ATTACHED | http://www.kyouzai... | http://www.kyouzai... | http://www.kyouzai... |
| PAGE_TITLE | TITLE OF DOCUMENT TO WHICH ELECTRONIC STICKY NOTE IS ATTACHED | INTRODUCTION | INTRODUCTION | MULTIVARIATE ANALYSIS |
| GROUP_ID | USER GROUP ID (SEE TABLE 2) | G1 | G1 | G2 |
| PARENT_ID | ID OF ELECTRONIC STICKY NOTE QUOTED. NO PARENT (=0) ONLY WHEN ELECTRONIC STICKY NOTE IS ATTACHED DIRECTLY TO DOCUMENT SCREEN | 0 | F1 | 0 |
| TAG_TITLE | ELECTRONIC STICKY NOTE TITLE | SYSTEM BUILDING | RE:SYSTEM BUILDING | ABOUT FACTOR |
| TAG_TYPE | MEDIA TYPE (TEXT:TEXT, HAND:HANDWRITING, PHOTO:IMAGE, MOVIE:ANIMATION, VOICE:AUDIO) OF ELECTRONIC STICKY NOTE | HAND | TEXT | TEXT |
| TAG_DATA | ELECTRONIC STICKY NOTE DATA SPECIFIED BY TAG_TYPE | http://www.media... | (NONE) | (NONE) |
| TAG_COMMENT | DESCRIPTION OF ELECTRONIC STICKY NOTE | THE MEANING OF THE UNDERLINED PART IS... | REGARDING THAT POINT... | DEPENDING ON WHICH FACTOR IS TAKEN... |

FROM FIG. 30A

| | | | | |
|---|---|---|---|---|
| TAG_DATE | CREATION DATE AND TIME | 2003/10/08, 14:33:18 | 2003/10/09, 10:05:24 | 2003/11/19, 13:56:19 |
| TAG_ANNOTATOR | CREATOR (ANNOTATOR) NAME (CORRESPONDING TO USER_NAME) | TANAKA | SUZUKI | TANAKA |
| TAG_PATH | PATH ON HTML TREE OF OBJECT CORRESPONDING TO DOCUMENT SUB-BLOCK TO WHICH ELECTRONIC STICKY NOTE IS ATTACHED | /0/1/4/0/6/1/0/0/0 | /0/1/4/0/6/1/0/0/0 | /0/1/16 |
| TAG_OFFSET | TWO-DIMENSIONAL OFFSET VALUE OF ELECTRONIC STICKY NOTE VIEWED FROM LOCAL ORIGIN POSITION OF OBJECT SPECIFIED BY TAG_PATH | 120px, 32px | 120px, 32px | 36%, 58% |
| TAG_KEYWORD | ELECTRONIC STICKY NOTE SEARCH KEYWORD | UXL, XML... | UXL, XML... | MULTIFACTORIAL, STATISTICS... |
| TAG_BGCOLOR | ELECTRONIC STICKY NOTE BACKGROUND COLOR | LIGHTGOLDENRODYELLOW | LIGHTGOLDENRODYELLOW | LIGHTGOLDENRODYELLOW |
| TAG_FONTCOLOR | ELECTRONIC STICKY NOTE TEXT COLOR | BLACK | BLACK | BLACK |
| PRIORITY | LEVEL OF IMPORTANCE (1-5) | 3 | 5 | 2 |
| PERMISSION | SPECIFY VIEWABLE OR NOT(R), DELETABLE OR NOT(D), AND QUOTABLE OR NOT(F) FOR CREATOR (ANNOTATOR) (1-3), TEACHER(4-6), AND GROUP MEMBER (7-9) | rdf r-f | rdf rdf r-f | rdf --- |
| STANCE | USE OF ELECTRONIC STICKY NOTE WITH RESPECT TO QUOTED ELECTRONIC STICKY NOTE ("APPROVAL", "REBUTTAL", "SUPPLEMENT", "QUESTION", "ANSWER", ETC.) | QUESTION | ANSWER | SUPPLEMENT |

FIG. 31

| ELECTRONIC STICKY NOTE AGGREGATION | ELECTRONIC STICKY NOTE AGGREGATION AFTER SUBSTITUTION |
|---|---|
| $\bar{T}_i$ | $\bar{T}_k$ |
| $\bar{T}_j$ | $\bar{T}_k$ |
| $\bar{T}_k$ | $\bar{T}_q$ |
| $\bar{T}_p$ | $\bar{T}_q$ |
| ⋮ | ⋮ |

FIG. 32

| TAG_ID | BRANCH ID |
|---|---|
| $T_i$ | $B_k$ |
| $T_j$ | $B_k$ |
| $(B_k)$ | $B_q$ |
| $T_p$ | $B_q$ |
| ⋮ | ⋮ |

FIG. 33

| X (RATIO OF ATTACHING ELECTRONIC STICKY NOTE) | Y (DISCUSSION PARTICIPATION RATIO) | | | |
|---|---|---|---|---|
| | 40%– | 20-40% | 10-20% | –10% |
| 70%– | A | A | B | C |
| 30-70% | A | B | C | C |
| 10-30% | B | C | D | D |
| –30% | C | C | D | D |

FIG. 34

| STANCE | PERMISSON |
|---|---|
| QUESTION | rdf r-f ... |
| DISCUSSION | rdf ... rdf |
| MEMORANDUM | rdf ... ... |
| ⋮ | ⋮ |

INFORMATION SHARING DEVICE AND INFORMATION SHARING METHOD

BACKGROUND OF THE INVENTION

The present invention relates to a technique of managing annotation data for electronic documents on a network. More specifically, the present invention relates to a technique that enables teachers and students to share and annotate a learning material in the form of electronic document.

Several Japanese patent applications have been laid open which deal with methods of making annotations on electronic documents, and there are also a few commercially available services for annotating electronic documents. See Patent Document 1, Non-patent Document 1, for example.

Such prior art techniques are designed to either share or monopolize information annotated and does not have a function to simultaneously display an electronic sticky note to be shared and one not to be shared, making them lacking in features for e-learning which involves communications with others.

Meanwhile, attempts have been made in e-learning and review uses, where the present invention can be utilized, to improve learning effects and brush up learning materials by annotating electronic documents. For instance, a document managing device with which review members comment (annotate) on an electronic document in reviewing the document (see Patent Document 2) and a method and system for compiling a group learning material which have a function of enabling learners to make simple annotations on learning materials (see Patent Document 3) have been proposed.

The techniques disclosed in Patent Documents 1 through 4 below are examples of prior art related to the invention of this application.

[Patent document 1] JP 2002-108897 A
[Patent document 2] JP 6-274493 A
[Patent document 3] JP 10-214022 A
[Patent document 4] JP 2001-228789 A
[Patent document 5] JP 2002-132129 A
[Patent document 6] JP 2002-132131 A
[Patent document 7] JP 2002-132965 A
[Patent document 8] JP 8-235231 A
[Patent document 9] JP 9-231040 A
[Non-Patent document 1] Internet Sticky Note Papers Research Institute for System Science, NTT Data Corporation, search date Mar. 1, 2004.
http://www.riss-net.jp/edemo/yachiyo.html

SUMMARY OF THE INVENTION

The conventional systems described above, which have as their main purposes creation of learning materials and review of documents, demand users to perform special manipulation. When applied to e-learning, these systems force users to perform processing irrelevant to users' purpose, learning, namely to understand information in an electronic document, and it makes this application pointless.

Therefore, desired is an e-learning system having a mechanism which enables users to annotate an electronic document (learning material) through operations usually performed to develop a better understanding (for example, taking notes, organizing questions, and itemizing) and which enables users to extract, from the annotation data, information necessary for review and creation of learning materials.

An object of the present invention is to provide a technique which enables users to add annotation information to an electronic document on a network with ease and to share the annotation information within a disclosure range of the annotation information.

The present invention solves the problems mentioned above by employing the following means.

That is, an information sharing device of the present invention includes:

an information providing unit providing electronic information in a state that allows the electronic information to have annotation information attached;

an annotation storing unit storing annotation information to be attached to the electronic information;

an attribute storing unit storing attribute information which indicates a disclosure range of the annotation information; and an annotation management unit, when requested from a user to provide annotation information, retrieving annotation information that is disclosed to the user from the annotation storing unit by consulting the attribute storing unit to provide the annotation information to a terminal of the user.

The information sharing device may take the following configurations.

The attribute storing unit stores as the attribute information the level of importance of annotation information and e-mail addresses of the respective users, and has a notification unit sending, when annotation information whose level of importance is stated to be equal to or higher than a predetermined level by its attribute information is stored in the annotation storing unit, e-mail to users who are within the disclosure range of the annotation information.

The attribute storing unit stores as the attribute information user identification information of a user who has created annotation information and e-mail addresses of the respective users, and has a notification unit retrieving, when annotation information that follows up the former annotation information is added, the e-mail address of the user who has created the original annotation information by consulting the attribute storing unit to send, via e-mail, the URL where the follow-up annotation information is displayed or the follow-up annotation information itself to the user at the retrieved address.

The notification unit extracts, at predetermined intervals, from annotation information available to the respective users, summary information of annotation information about which no e-mail has been sent, and sends the summary information via e-mail to the address of a corresponding user.

A mail registration unit is provided which, when the notification unit sends the e-mail including identification information of the annotation information and e-mail containing the identification information and follow-up information for the annotation information is returned, extracts the follow-up information from the returned e-mail to store the follow-up information in the annotation storing unit as follow-up annotation information for annotation information that is specified by the identification information.

When the returned e-mail has a multimedia file attached thereto, the mail registration unit registers the multimedia file in a media management unit and adds information on a link to the multimedia file to the follow-up annotation information.

When notified from the user terminal to create follow-up annotation data, the annotation management unit changes the color or luminance of the text or image which is the original annotation information, and provides the data as quotation data to the user terminal.

When a request to provide annotation information is received from a terminal of a first user along with identification information that specifies a second user, the annotation management unit extracts, from the annotation storing unit, annotation information which is available to the first user and which is created by the second user who matches the identification information to provide the annotation information to the terminal of the first user.

An annotation analyzing unit is provided which, when an instruction to compile annotation information for the electronic information is sent from one of the user terminals, compiles annotation information added to the electronic information for every predetermined number of blocks and presents the result compiling to the user terminal.

An annotation searching unit is provided which looks up the annotation information and electronic information to which the annotation information is added for a search keyword to retrieve annotation information containing the search keyword and annotation information added to information that contains the search keyword.

An annotation analyzing unit is provided which calculates the similarity between annotation information or between groups of annotation information and which outputs data for displaying annotation information in tree format or as a two-dimensional distribution based on the similarity obtained.

An understanding degree judging unit is provided which estimates user's degree of understanding of a document based on annotation data added to electronic information from the terminal of the user.

An online learning system of the present invention, which has the information sharing device, provides a learning material in the form of the electronic information to terminals of students as the users and to terminals of teachers as the users, and provides annotation information added to the learning material to student terminals and teacher terminals based on the disclosure range.

An information sharing method of the present invention includes causing a computer to execute the steps of:

providing electronic information in a state that allows the electronic information to have annotation information attached;

storing annotation information to be attached to the electronic information in an annotation storing unit;

storing attribute information which indicates a disclosure range of the annotation information in an attribute storing unit; and retrieving, when requested from a user to provide annotation information, annotation information that is disclosed to the user from the annotation storing unit by consulting the attribute storing unit to provide the annotation information to a terminal of the user.

The information sharing method may take the following configurations.

The step of storing annotation information includes the steps of storing the level of importance of annotation information and e-mail addresses of the respective users as attribute information in the attribute storing unit, and sending e-mail to users within the disclosure range when annotation information whose level of importance is stated to be equal to or higher than a predetermined level by its attribute information is stored in the annotation storing unit.

The step of storing annotation information includes the steps of:

storing identification information of a user who has created annotation information and e-mail addresses of the respective users as the attribute information in the attribute storing unit; and retrieving, when annotation information that follows up the former annotation information is added, the e-mail address of the user that has created the original annotation information by consulting the attribute storing unit to send, via e-mail, the URL where the follow-up annotation information is displayed or the follow-up annotation information itself to the user at the retrieved address.

The method includes the steps of extracting, at predetermined intervals, from annotation in formation available to the respective users, summary information of annotation information about which no e-mail has been sent, and sending the summary information via e-mail to the address of a corresponding user.

A mail registration unit is provided which, when the e-mail sent in the step of sending e-mail contains identification information of the annotation information and e-mail containing follow-up information for the annotation information and the identification information is returned, extracts the follow-up information from the returned e-mail and stores the follow-up information in the annotation storing unit as follow-up annotation information for annotation information that is specified by the identification information.

The computer has a media management unit storing a multimedia file and, when the returned e-mail has a multimedia file attached thereto, the multimedia file is registered in the media management unit and information on a link to the multimedia file is added to the follow-up annotation information in the step of registering annotation information.

The method includes the steps of changing, upon receiving a notification to create follow-up annotation data from the user terminal, the color or luminance of the text or image which is the original annotation information, and providing the data as quotation data to the user terminal.

When a request to provide annotation information is received from a terminal of a first user along with identification information that specifies a second user, annotation information which is available to the first user and which is created by the second user who matches the identification information is extracted from the annotation storing unit to provide the annotation information to the terminal of the first user.

The method includes the step of compiling, when an instruction to compile annotation information for the electronic information is sent from one of the user terminals, annotation information added to the electronic information for every predetermined number of blocks to provide the compiling result to the user terminal.

The method includes the step of looking up the annotation information and electronic information to which the annotation information is added for a search keyword to retrieve annotation information containing the search keyword and annotation information added to information that contains the search keyword.

The method includes the steps of calculating the similarity between annotation information or between groups of annotation information and outputting data for displaying annotation information in tree format or as a two-dimensional distribution based on the similarity obtained.

The method includes the step of estimating user's degree of understanding of a document based on annotation data added to the electronic information from the terminal of the user.

An information sharing program of the present invention causes a computer to execute the steps of:

providing electronic information in a state that allows the electronic information to have annotation information attached;

storing annotation information to be attached to the electronic information in an annotation storing unit;

storing attribute information which indicates a disclosure range of the annotation information in an attribute storing unit; and retrieving, when requested from a user to provide annotation information, annotation information that is disclosed to the user from the annotation storing unit by consulting the attribute storing unit to provide the annotation information to a terminal of the user.

The information sharing program of the present invention may further cause the computer to execute the information sharing method described above in addition to the steps described above.

Further, an information sharing system according to the present invention includes user terminals, and an information sharing device for providing the user terminals with electronic information, the information sharing device including:

an information providing unit providing electronic information in a state that allows the electronic information to have annotation information attached;

an annotation storing unit storing annotation information to be attached to the electronic information;

an attribute storing unit storing attribute information which indicates a disclosure range of the annotation information; and an annotation management unit, when requested from a user to provide annotation information, retrieving annotation information that is disclosed to the user from the annotation storing unit by consulting the attribute storing unit to provide the annotation information to a terminal of the user, the user terminals each having:

an information requesting unit requesting the information sharing device to provide electronic information and annotation information; and display means for displaying electronic information obtained from the information sharing device with annotation information superimposed on the electronic information.

The information sharing device in the information sharing system of the present invention may have the configuration of the information sharing device described above.

A user terminal according to the present invention, which is connected to the information sharing device via a network, includes:

an information requesting unit requesting the information sharing device to provide the electronic information and annotation information; and display means for displaying electronic information obtained from the information sharing device with annotation information superimposed on the electronic information.

The user terminal may include:

an annotation creating unit creating annotation information that contains at least information about the contents of an annotation, the location where the annotation is to be attached, and the range of disclosure of the annotation for the electronic information or annotation information; and an annotation transmitting unit sending the created annotation information to the information sharing device.

The user terminal may include:

an annotation creating unit changing, when follow-up annotation information is to be added to the annotation information, the color or luminance of the text or image which is the original annotation information to obtain quotation information, and then creating annotation information by adding the follow-up contents to the quotation data; and an annotation transmitting unit sending the created annotation information to the information sharing device.

An information sharing program for user terminals according to the present invention, which is run in user terminals connected to the information sharing device via a network, causes the user terminals to execute the steps of:

requesting the information sharing device to provide the electronic information and annotation information; and displaying electronic information obtained from the information sharing device with annotation information superimposed on the electronic information.

The information sharing program for user terminals may be provided to the user terminals from the information sharing program described above by being incorporated in the electronic information.

Further, the program for user terminals may include the steps of:

creating annotation information that contains at least information about the contents of an annotation, the location where the annotation is to be attached, and the range of disclosure of the annotation for the electronic information or annotation information; and sending the created annotation information to the information sharing device.

In the program for user terminals, the user terminals may each have:

an annotation creating unit changing, when follow-up annotation information is to be added to the annotation information, the color or luminance of the text or image which is the original annotation information to obtain quotation information, and then creating annotation information by adding the follow-up contents to the quotation data; and an annotation transmitting unit sending the created annotation information to the information sharing device.

The present invention may be implemented as a recording medium in which the program is recorded in a computer-readable manner. The program in the recording medium is read and executed by a computer, to thereby provide the function of the program.

The computer-readable recording medium here means a recording medium which accumulates information such as data and a program through an electric, magnetic, optical, mechanical, or chemical action to be read by a computer. Of such recording media, ones that are detachable from computers are, for example, flexible disks, magneto-optical disks, CD-ROMs, CD-R/Ws, DVDs, DATs, 8 mm tapes, and memory cards.

Recording media that are fixed to computers are hard disks, ROMs (read only memories), and the like.

DESCRIPTION OF THE DRAWINGS

FIG. 8 is a diagram showing an electronic sticky note creating dialogue box.

FIG. 13 is a diagram showing an electronic sticky note list dialogue box.

FIG. 16 is a diagram showing a same electronic sticky note list dialogue.

FIG. 27 is a user management table.

FIG. 28 is a user group management table.

FIG. 29 is a group member management table.

FIG. 30A-30B are electronic sticky note management tables.

FIG. 31 is a substitution relation table.

FIG. 32 is a diagram showing Binary tree configuration data.

FIG. 33 is an understanding degree judging table.

FIG. 34 is a permission table.

DETAILED DESCRIPTION OF THE INVENTION

The best mode for carrying out the present invention will be described below with reference to the accompanying drawings. The structure of the following embodiment is shown for exemplification, and is not to limit the present invention.

<System Configuration>

Figure 1:
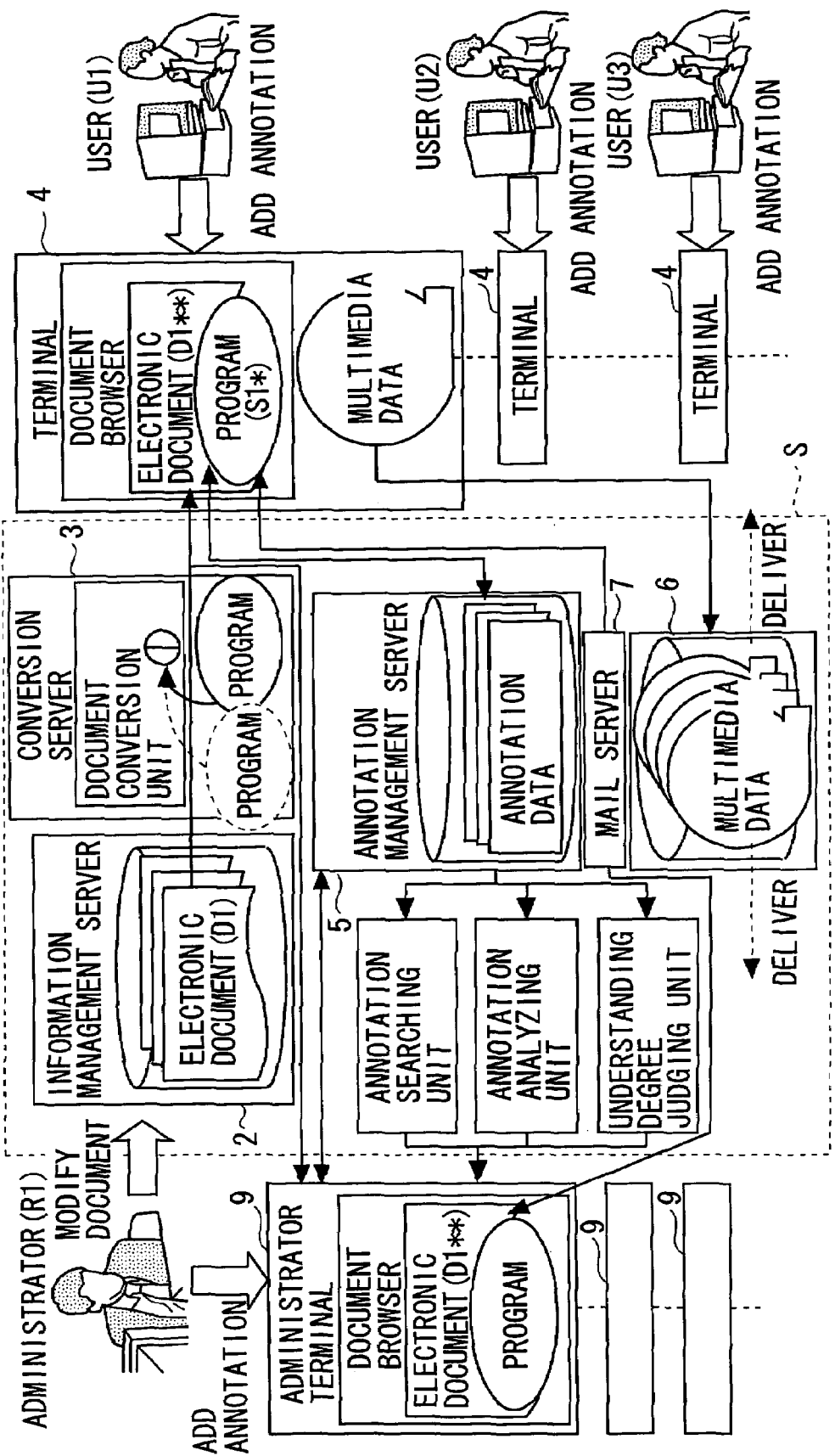
FIG. 1 is a schematic configuration diagram of an information sharing system.

FIG. 1 is an explanatory diagram illustrating the schematic configuration of an information sharing system which has an information sharing device according to the present invention.

As shown in FIG. 1, an information sharing system S of this embodiment has an information management server 2, a conversion server 3, an annotation management server 5, a media management server 6 and a mail server 7, so that plural user terminals 4, 4, 4 . . . , which utilize electronic information and annotation information, and an administrator terminal 9, which creates electronic information or analyzes annotation information as well as utilizes electronic information and annotation information, can communicate with each other by sharing the information. Electronic information and annotation information here are texts, images (still images and animation), music, drawings (CAD data or the like), programs, and other computer-processable information. When the electronic information is text data, annotation information can be added to the data by a given unit, e.g., on a character-to-character basis, word-to-word basis, or paragraph-to-paragraph basis, or by coordinates on a page. When the electronic information is a program that entails display of images or drawings, annotation information can be added to the program by coordinates on a display screen or by areas created by dividing the display screen. When the electronic information is animation, music, a program, or other similar data that develops with time, a time chart (may be score in the case of music data) is displayed and annotation information added is put on the chart.

The information management server 2 has an information storing unit for storing contents as electronic information.

The conversion server (corresponding to the information providing unit) 3 converts electronic information into a format that allows the electronic information to have annotation information added, and delivers the converted information. The conversion server 3 has an information acquisition unit, which obtains from the information management server 2 electronic information requested by the user terminals 4, 4, 4 . . . and 9, and an information conversion unit, which converts the obtained information into a given format in order to enable users to make annotations.

The annotation management server 5 is a server for managing annotation information, and has an annotation storing unit, an attribute storing unit, an annotation management unit, a notification unit, a mail registration unit, an annotation searching unit, an annotation analyzing unit, and an understanding degree judging unit. The annotation storing unit stores annotation information to be added to electronic information. The attribute storing unit stores attribute information which indicates a disclosure range of the annotation information, the position at which the annotation information is added, identification information of a creator of the annotation information, and the level of importance. The annotation management unit consults, when receiving a request from a user to provide annotation information, the attribute storing unit to retrieve annotation information that is disclosed to the user and provide the annotation information to the terminal of the user.

The notification unit sends, when annotation information whose level of importance is stated to be equal to or higher than a given level by its attribute information is stored in the annotation storing unit, e-mail to users who are within the disclosure range of the annotation information via the mail server 7. When annotation information that follows up the former annotation information is added, the notification unit retrieves the e-mail address of the user that has created the original annotation information by consulting the attribute storing unit to send, via e-mail, the URL where the follow-up annotation information is displayed or the follow-up annotation information itself to the user at the retrieved address. The notification unit extracts, at given intervals, from annotation information available to the respective users, summary information of annotation information about which no e-mail has been sent, and sends the summary information via e-mail to the address of a corresponding user. E-mail addresses of the respective users may be stored as attribute information directly in the attribution storing unit of the annotation management server 5. Alternatively, a user management server may be provided which manages user information including user identification information, which is stored in the attribute storing unit, and users' e-mail addresses, so that the e-mail address of a user is read as the need arises from the user management server based on the identification information of the user which is attribute information.

When e-mail containing follow-up information for the annotation information is returned, the mail registration unit extracts the follow-up information from the returned e-mail and stores the follow-up information in the annotation storing unit as follow-up annotation for annotation information that is specified by the identification information. When the returned e-mail has a multimedia file attached thereto, the mail registration unit registers the multimedia file in the media management unit and adds information on a link to this file to the follow-up annotation information.

The annotation analyzing unit analyzes the trend of annotation information and, when an instruction to compile annotation information for electronic information is sent from one of the user terminals, compiles annotation information added to the electronic information for every given number of blocks to provide the result to the user terminal.

The annotation searching unit looks up annotation information, electronic information to which annotation information is added, and annotation information for which follow-up annotation information is created for a search keyword to find annotation information containing the search keyword and annotation information added to information that contains the search keyword.

The understanding degree judging unit estimates user's degree of understanding a document based on annotation data added to electronic information through the terminal of the user.

The media management server 6 manages multimedia information such as audio data.

The mail server (corresponding to the notification unit) 7 is a server for sending and receiving e-mail to and from users.

The user terminals 4, 4, 4 . . . and 9 each have an information requesting unit for requesting the information sharing device to provide electronic information and annotation information, a display unit for displaying electronic information that is obtained from the information sharing device with annotation information superimposed on the electronic information, and annotation creating unit for creating annotation information.

These servers or terminals are general computers having computing units that are made up of CPUs, memories, and other components, and function as the respective units of the system described above by having their computing units process information as programs dictate.

<Outline>

Figure 25:
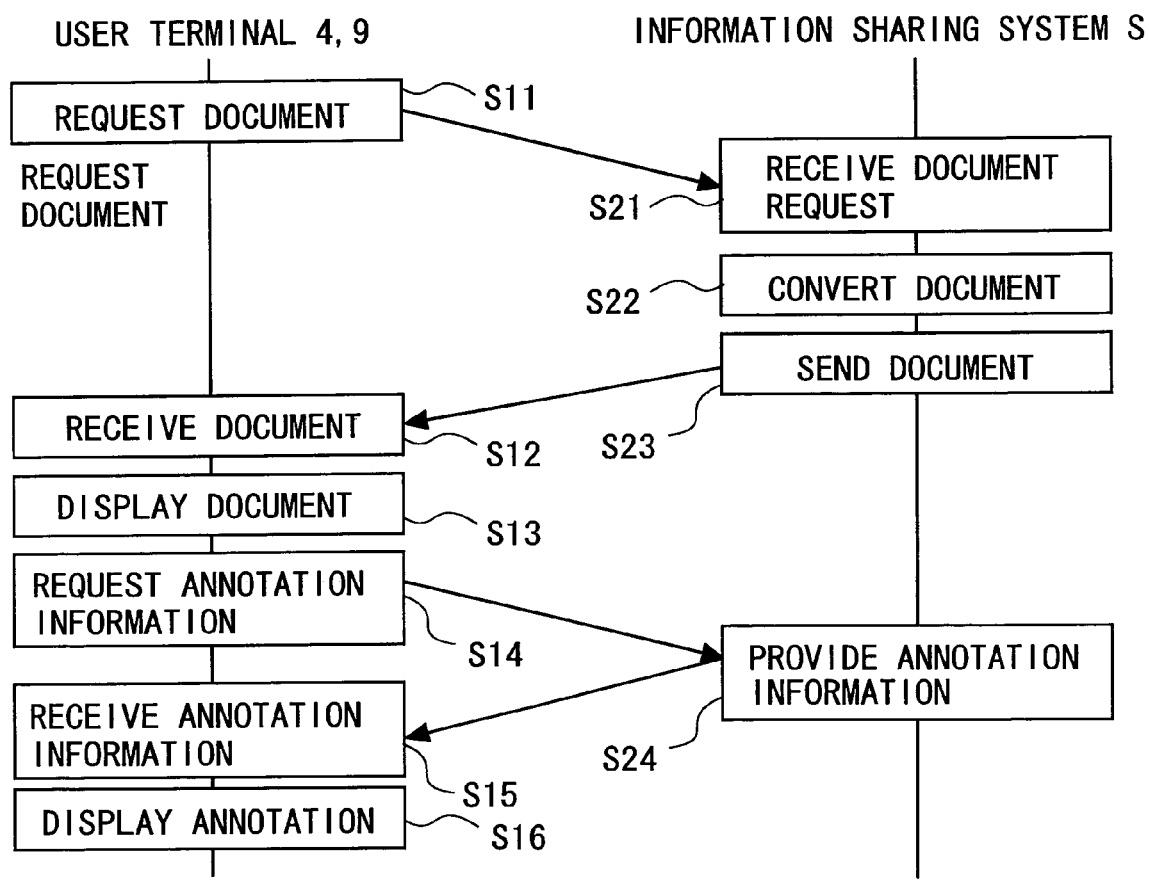
FIG. 25 is an explanatory diagram of a procedure of obtaining electronic information and annotation information.
Figure 26:
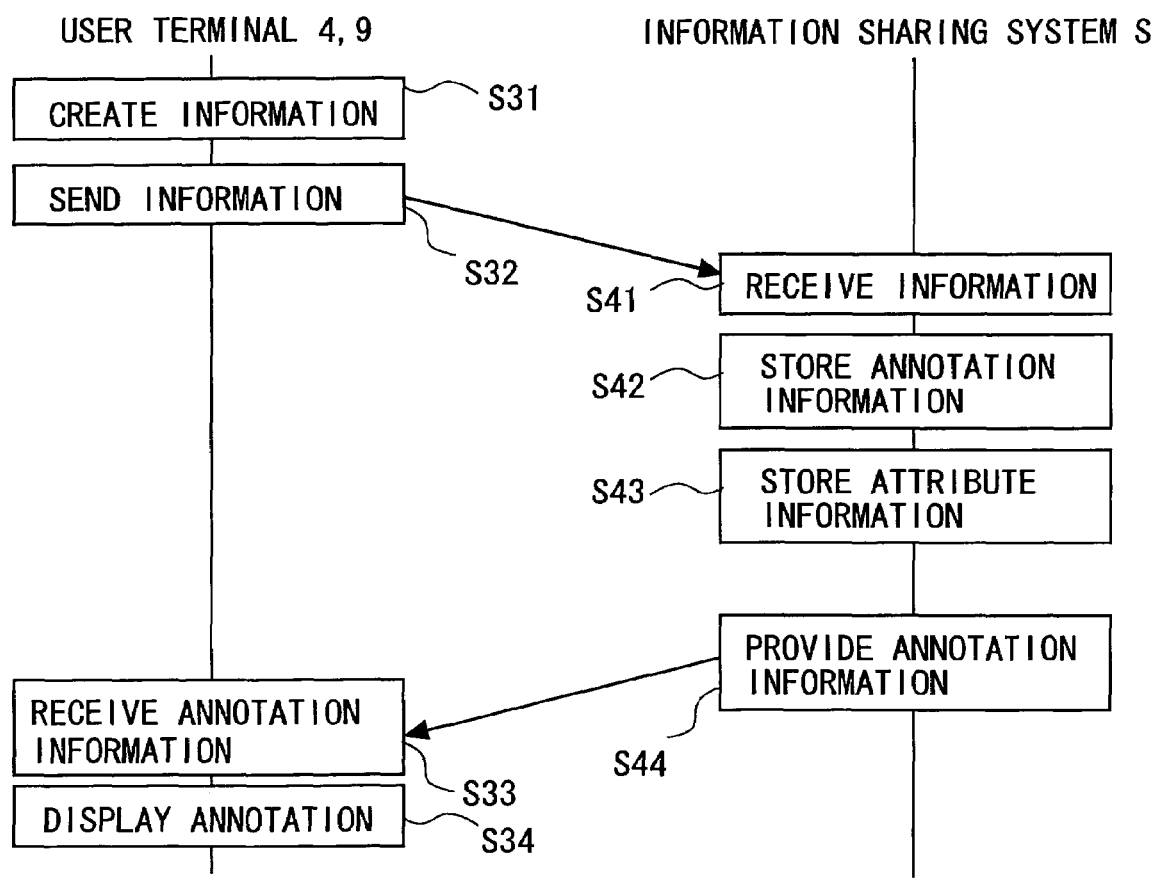
FIG. 26 is an explanatory diagram of a procedure of adding annotation information.

How information is shared through this system is described next. FIG. 25 is an explanatory diagram showing steps of obtaining electronic information and annotation information. FIG. 26 is an explanatory diagram showing steps of adding annotation information.

First, one of the user terminals 4, 4, 4 . . . requests a document (electronic information) D1 which the user of this user terminal desired to use (Step S11, hereinafter abbreviated as S11). The information sharing system S receives the request (S21), and the conversion server 3 fetches the document D1 from the information management server 2 or others to convert the document into a given format (S22). To elaborate, the document conversion server 3 adds a program (P1), which is for obtaining and displaying annotation, or a link to the original document D1, and divides the electronic document D1 into sub-blocks (unit by which annotation is added) creating an index for each sub-block, for example. The document D1 after conversion is called an electronic document D1*. The document conversion is performed only on data to be delivered and the original document D1 stored is kept intact.

The conversion server 3 sends the electronic document D1* to the user terminal 4 that has made the request (S23).

Receiving the electronic document D1* (S12), the user terminal 4 uses a browser 41 to display the electronic document D1* on its display (S13). While displaying the electronic document D1*, the user terminal 4 executes the program P1 buried in the document D1* (corresponding to an information sharing program for user terminals), or the program P1 downloaded through the link buried in the document D1*. In this embodiment, the user terminal 4 activates the browser and executes the program P1 to function as the information requesting unit, the display unit, and the annotation creating unit.

Following the program P1, the user terminal 4 requests the annotation management server 5 to provide annotation information (S14). The system S chooses from all annotation information for the electronic document D1 only those that are available for inspection according to their annotation attribute, in other words, annotation information whose disclosure range includes the user, and provides the selected annotation information to the user (S24). Examples of annotations available for inspection include:

(1) annotation information added by the user himself/herself;

(2) annotation information permitted to share by an administrator; and (3) annotation information permitted to share by another user irrespective of whether the permission is given explicitly or not. Of such annotation information, only those that have not been provided to users yet may be chosen. Obtaining such annotation information (S15), the user terminal 4 displays the annotation in the form of text data or handwritten data or, in the case of multimedia data, an icon for a link by overlaying the annotation information on the corresponding portion of the electronic document D1* (S16). When the link icon is executed with a click of a mouse or the like, the document browser requests the media management server 6 to deliver linked media data and replays related multimedia data.

The program P1 also has a function of adding an annotation to the electronic document D1. Using a mouse, a keyboard or the like, the user adds an annotation to the electronic document D1* displayed on the browser. The user terminal 4 follows the program P1 to create annotation information added and attribute information which indicates the area (sub-block) where the annotation information is added as well as a disclosure range of the annotation information (S31). The annotation information and the attribute information are sent to the annotation management server 5 (S32). Upon reception of the annotation information and the attribute information (S41), the system S stores the annotation information in the annotation storing unit (S42) and stores the attribute information in the attribute storing unit (S43). The system S provides the annotation information stored to the sender (S44). The user terminal 4 receives the newly added annotation information to display (S33, S34). In this way, the information can be shared between users that are included in the disclosure range out of users that have requested the electronic document D1.

In the case where the annotation is in text, the text information is registered in the annotation management server 5 along with, for example, information about the position on the document of a document constituent (an object path or pixel coordinates). In the case where the annotation is a still medium such as a still image, the corresponding media file is uploaded onto the media management server 6, where a link to the corresponding medium is registered in the annotation management server 5 along with the position information of the document constituent. In the case where the annotation is a sequential medium such as animation data, the media file is uploaded onto the media management server 6 while registering, in the annotation management server 5, the start time and finish time of the sequential medium corresponding to a document constituent, a link to the media on the media management server 6, and the position information of the document constituent.

In registering an annotation, the user terminal 4 also specifies the range of disclosure of the annotation. The disclosure range is registered by displaying a dialogue window allowing the user to input whether or not to share, or by determining annotation attributes in accordance with a choice made by the user. For instance, in an e-learning system, a user may choose from options including "memorandum", "question", and "discussion". When the "memorandum" option is chosen, the annotation is only for personal viewing and is not to be put on public view. When the "question" option is obtained, the annotation is shared only with the teacher. When the "discussion" option is chosen, the annotation is shared between users. In this way, the disclosure range which is one of annotation attributes is determined in accordance with choices made by users. It is also possible to add an annotation to a shared annotation. In the case of an annotation for which the "question" options is chosen, an annotation with an "answer" attribute which is shared only between the teacher and the specific user can be added. In the case of an annotation with the "discussion" attribute, an annotation every user is allowed to refer to can be added for continued discussion on the electronic document.

On the other hand, when an administrator uses the administrator terminal 9 to view the electronic document D1, it is an electronic document D1 converted by the document conversion server 3 that the administrator looks at. The electronic document D1 is processed the same way the electronic document D1* is processed except that a copy of or a link to an administrator program P2 is buried in the electronic document D1** by the server.

A document browser 91 of the administrator terminal 9 reads the electronic document D1 starting up the program P2, which obtains only annotations that are available to the administrator out of annotations on the electronic document D1 and causes the administrator terminal 9** to display the obtained annotations. Annotations available to an administrator includes:

(1) annotation information created by the administrator himself/herself, and (2) annotation information allowed to share with the administrator by a user.

Once annotation information obtained, text, hand-written data, or multimedia data is displayed in a corresponding document constituent of the electronic document D1 as the document browser described above has done. Similarly, it is possible to add an annotation and add a further annotation to a shared annotation. A typical example for the latter case is to add as an annotation an answer to a question from a student in an e-learning system.

In order to enable the administrator to examine the annotation use state of users, the program P2 adds a menu for searching and analyzing an annotation on the screen. As the administrator makes a choice from the menu, a screen to access the annotation searching unit, the annotation analyzing unit, and the understanding degree judging unit is opened. The annotation searching unit and the annotation analyzing unit performs a search and analysis processing using search items and analysis items which are specified by the administrator, and show the results to the administrator. Based on the results, the administrator adds an annotation and makes changes on the electronic document D1. For instance, in the case of an e-learning system, a teacher searches for annotations written by a specific student and has the screen display the annotations at once, to thereby check the student's degree of understanding and learning progress. The teacher also can collect data on which part of a specific learning material is found to be difficult to understand by students, so that the part is duly supplemented. It is also possible to save the teacher from the trouble of answering similar questions by analyzing the trend of questions and presenting answers to the typical questions. The understanding degree judging unit judges, from annotation information, the state of annotation writing on electronic documents for each user as well as the inter-user communications state, to thereby measure user activities. This makes it possible to estimate student's willingness to learn and degree of understanding in e-learning.

This system also has a function of sending e-mail upon a change in annotation information to users relevant to the annotation information to notify the change.

The level of importance, for example, high, middle, and low, is set to annotation information, and notification is made when the level of importance is equal to or higher than middle. As a user sends annotation information whose level of importance is set to middle to the system S, the system S stores the annotation information in the annotation storing unit, stores attribute information in the attribute storing unit, and sends e-mail through the mail server 7 to users within the disclosure range indicated by the attribute information.

E-mail is sent also when follow-up annotation information is added to annotation information. In this case, the e-mail is sent to a user that has created the original annotation information by consulting the attribute storing unit. The body of the e-mail contains the URL where the follow-up annotation information is displayed or the follow-up annotation information itself.

This system extracts, at given intervals, from annotation information available to the respective users, summary information of annotation information for which no search has been made as unclaimed annotation information, no notification according to the importance level has been made, and no notification has been made to inform addition of a follow-up, and sends the summary information via e-mail to the address of a corresponding user.

When e-mail containing follow-up information for annotation information is returned, the system takes the contents of the returned e-mail as follow-up annotation information. For instance, ID (identification information) of the original annotation information is extracted from the body of the received e-mail and the body of the mail is stored in the annotation storing unit as follow-up annotation information for annotation information that has this ID.

Management of shared annotations on electronic documents and a mechanism for analyzing the interest and degree of understanding from users' natural behavior, which have been objects to be attained, are thus achieved by the means described above. Other characteristics and implementation of the present invention will be described through embodiments below.

<Example of Application to E-Learning>

Figure 2:
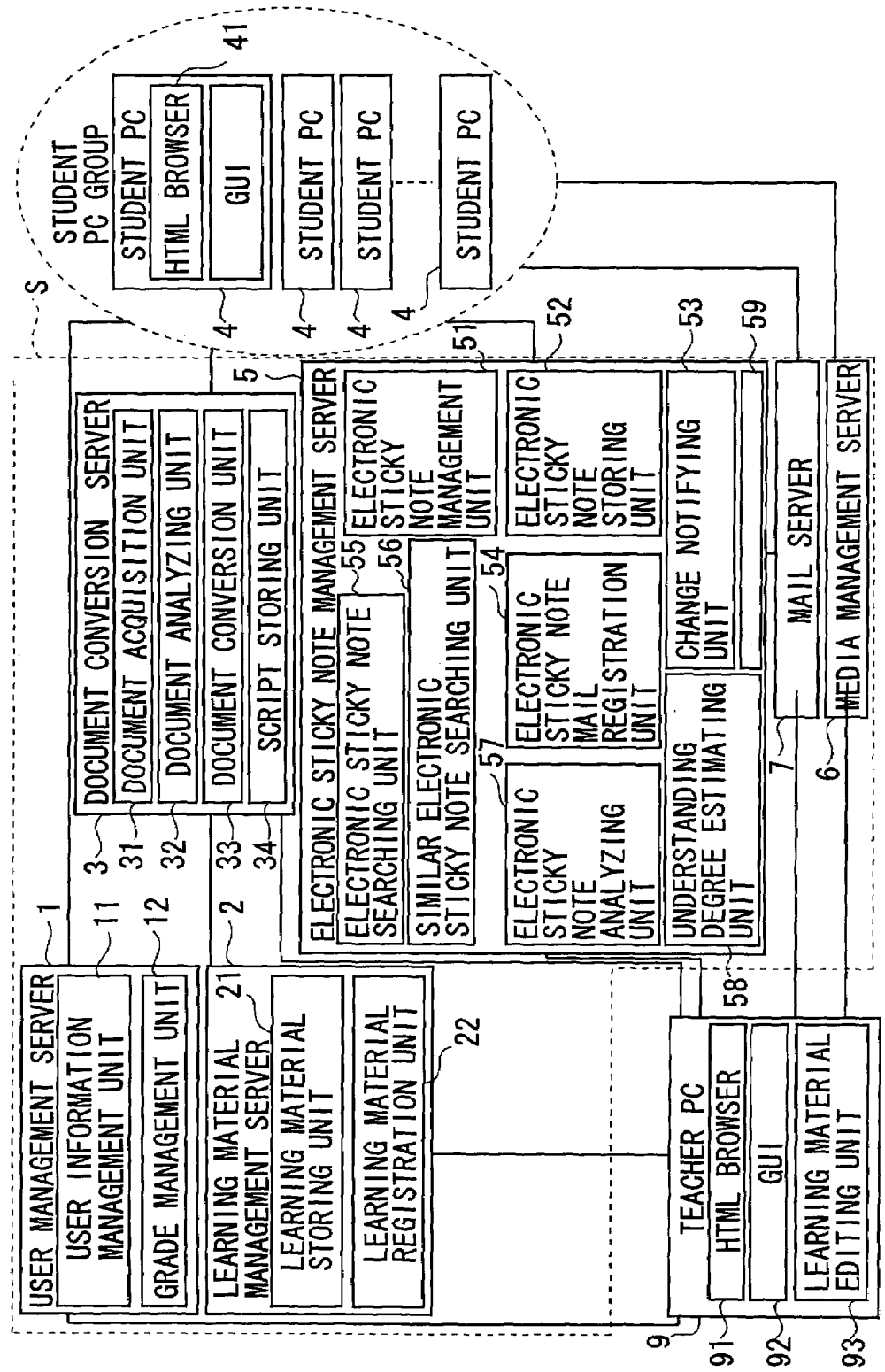
FIG. 2 is a schematic configuration diagram of an e-learning system.

FIG. 2 shows an example in which a document management device according to the present invention is applied to an e-learning system. Now, a description is given on an embodiment of the present invention based on this e-learning system. The system discussed here is for students to study individually on a network-based learning material, but may also be used for preparation for a face-to-face lesson (group education) and other similar occasions. A student learns his/her lessons by studying the learning material, writing findings as annotations in the learning material, asking a teacher questions, and discussing with fellow students.

The teacher answers questions from the student, estimates the student's interest and degree of understanding of the lessons, revises the learning material as the need arises, and narrows down central topics to be lectured off line in a face-to-face lesson. This system employs, as a form of annotation, "electronic sticky note". In the following description, the term "electronic sticky note" refers to annotation attached to an electronic document.

This e-learning system has a user management server 1, a learning material management server 2, a document conversion server 3, an electronic sticky note management server 5, a media management server 6, and a mail server 7, so that a learning materials can be shared between clients including student terminals 4, 4, 4 . . . and a teacher terminal 9. The operation and implementation of these components are described in detail below.

The user management server 1 is a server for managing information about users, and has a user information management unit 11, which manages user identification information, information of groups to which users belong, and the like, and a user grade management unit 12, which manages user grade information. The user information management unit 11 stores management information in which user information as the one shown in FIGS. 27 through 29 is registered. Information unique to respective users is stored in a user management table of FIG. 27. Each user belongs to one or more user groups, and user group information is stored in a user group management table of FIG. 28. An ID of a user group and IDs of users belonging to the user group are registered in a group member management table of FIG. 29 in a manner that clearly shows the association with each other. When a user discloses an electronic sticky note, the disclosed electronic sticky note can be shared between members of the same user group whereas members of other user groups cannot view the electronic sticky note despite the note being disclosed, as described later.

The learning material management server 2 has a learning material storing unit 21 for storing electronic information which serves as a learning material, and a learning material registration unit 22 for registering a learning material in the learning material storing unit 21.

The document conversion server (corresponding to the information providing unit) 3 converts electronic information (learning material) requested by a client into a format that allows the electronic information to have an annotation attached, and delivers the converted information. The document conversion server 3 has a document acquisition unit 31, which obtains electronic information requested by a client, a document analyzing unit 32, which analyzes the format of the obtained document, an information conversion unit 33, which converts the analyzed document into a given format in order to enable users to make annotations, and a script storing unit 34, which buries in the converted document a script (corresponding to the information sharing program for user terminals) that attaches and displays an electronic sticky note.

The electronic sticky note management server 5 is a server for managing electronic sticky note data, and has an electronic sticky note management unit (annotation management unit) 51, an electronic sticky note storing unit (annotation storing unit and attribute storing unit) 52, a change notifying unit 53, an electronic sticky note mail registration unit 54, an electronic sticky note searching unit (annotation searching unit) 55, a similar electronic sticky note searching unit 56, an electronic sticky note analyzing unit (annotation analyzing unit) 57, an understanding degree judging unit 58, and a permission table (condition storing unit) 59. In this embodiment, annotation information and attribute information are stored in the same electronic sticky note management table inside the electronic sticky note storing unit 52. FIG. 30 is an explanatory diagram of the electronic sticky note management table. In the drawing, electronic sticky note explanation items correspond to annotation information and the rest of the items correspond to attribute information. In the case where annotation information is multimedia information (information other than text), the multimedia information is stored in the media management server 6 whereas a link to this information and other attribute information are stored in the electronic sticky note management table.

The media management server 6 manages multimedia information such as audio data.

The mail server 7 is a server for sending and receiving e-mail to and from clients. Processing by the mail server 7 includes sending e-mail to notify an update of electronic sticky note data and extracting electronic sticky note from received e-mail to input the extracted data in the electronic sticky note management server.

The student terminals 4, 4, 4 . . . each have an HTML browser 41 for displaying a learning material and a graphical user interface (GUI) 42 for presenting options and inputting information.

The teacher terminal 9 has an HTML browser 91 for displaying a learning material, a graphical user interface (GUI) 92 for presenting options and inputting information, and a learning material editing unit 93 for editing a learning material.

The servers and clients are general computers having computing units that are made up of CPUs, memories, and other components, and function as the respective units described above by having their computing units process information as programs dictate.

Described next is a document management method executed in the system structured as above.

Figure 3:
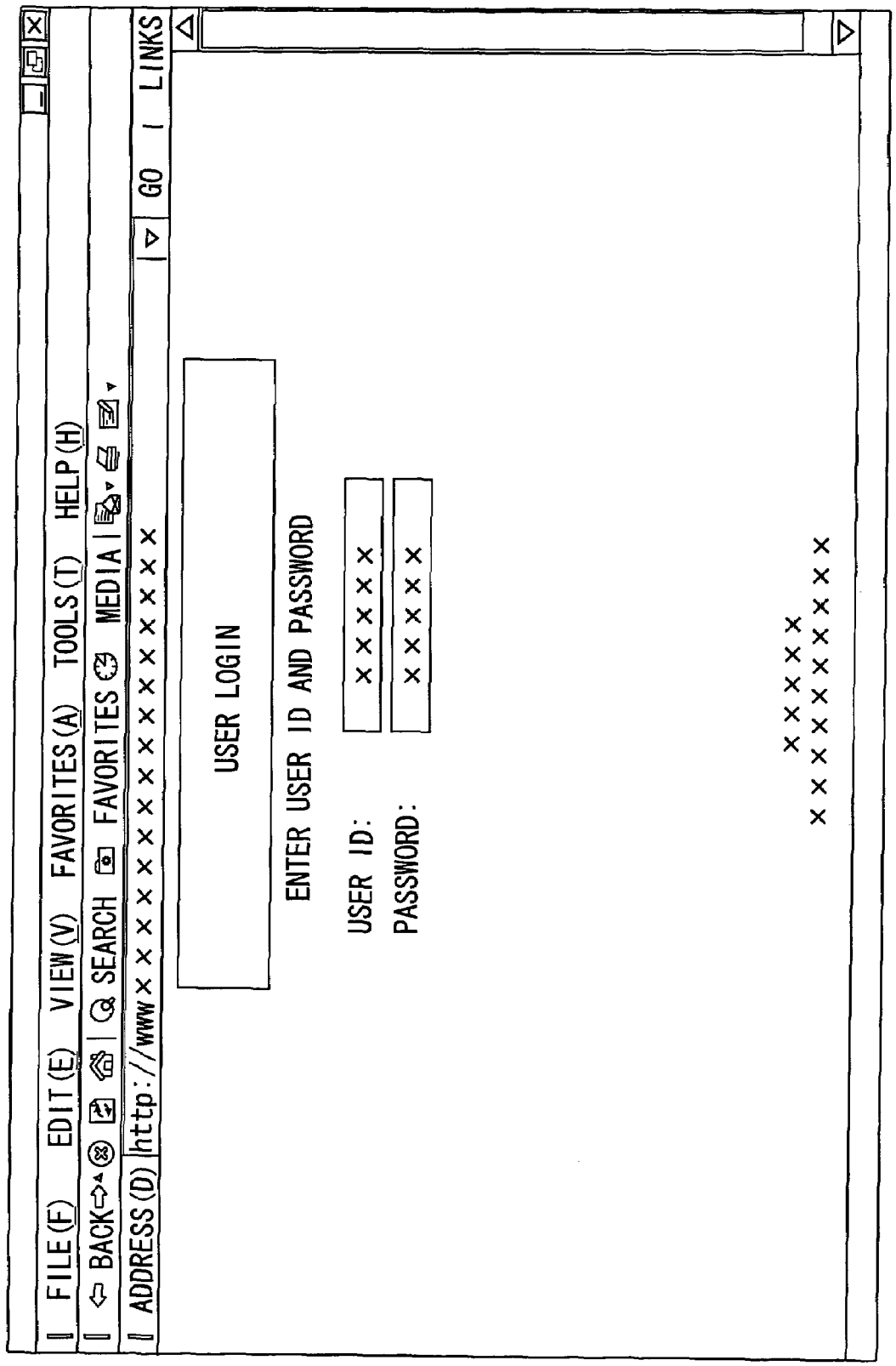
FIG. 3 is a diagram showing a login screen.

In utilizing this system, students and a teacher first start up the browsers 41 and 91 by manipulating the GUIs 42 and 92 of the terminals 4, 4, 4 . . . and the terminal 9 to access the user management server 1. The terminals 4, 4, 4 . . . and the terminal 9 display a login screen (FIG. 3) on their displays through the browsers 41 and 91 prompting the users to input user IDs and passwords. The browsers 41 and 91 send user IDs and passwords inputted by the users to the user management server 1.

The user information management unit 11 of the user management server 1 compares the received user IDs and passwords with those registered in the user information shown in FIG. 27. When the received user IDs and passwords match the registered ones, the user information management unit 11 authenticates login of the corresponding users and sends information on permission to access other servers to the terminals 4, 4, 4 . . . and 9 of the users. When the received user IDs and passwords do not match the registered ones, the user information management unit 11 notifies the terminals 4, 4, 4 . . . and 9 that the user IDs and passwords are not authentic.

Receiving the access permission information, the terminals 4, 4, 4 . . . and 9 have the browsers 41 and 91 fetch and display a user portal screen. On the other hand, when informed that the user IDs and passwords sent are not authentic, the terminals 4, 4, 4 . . . and 9 display the login screen once more. The authentication processing may or may not be performed each time the servers are accessed. Once given, the validity may be effective until the user management server 1 is notified of log out. Alternatively, a user granted login may be treated as being in the login state until a given period elapses since the last time the user accessed the server. For instance, access permission information with expiration date which indicates a login state is set in cookie and, when the user terminals 4, 4, 4 . . . and 9 access the server, the cookie is sent to the server where the access permission information of the cookie is checked for its validity.

Figure 4:
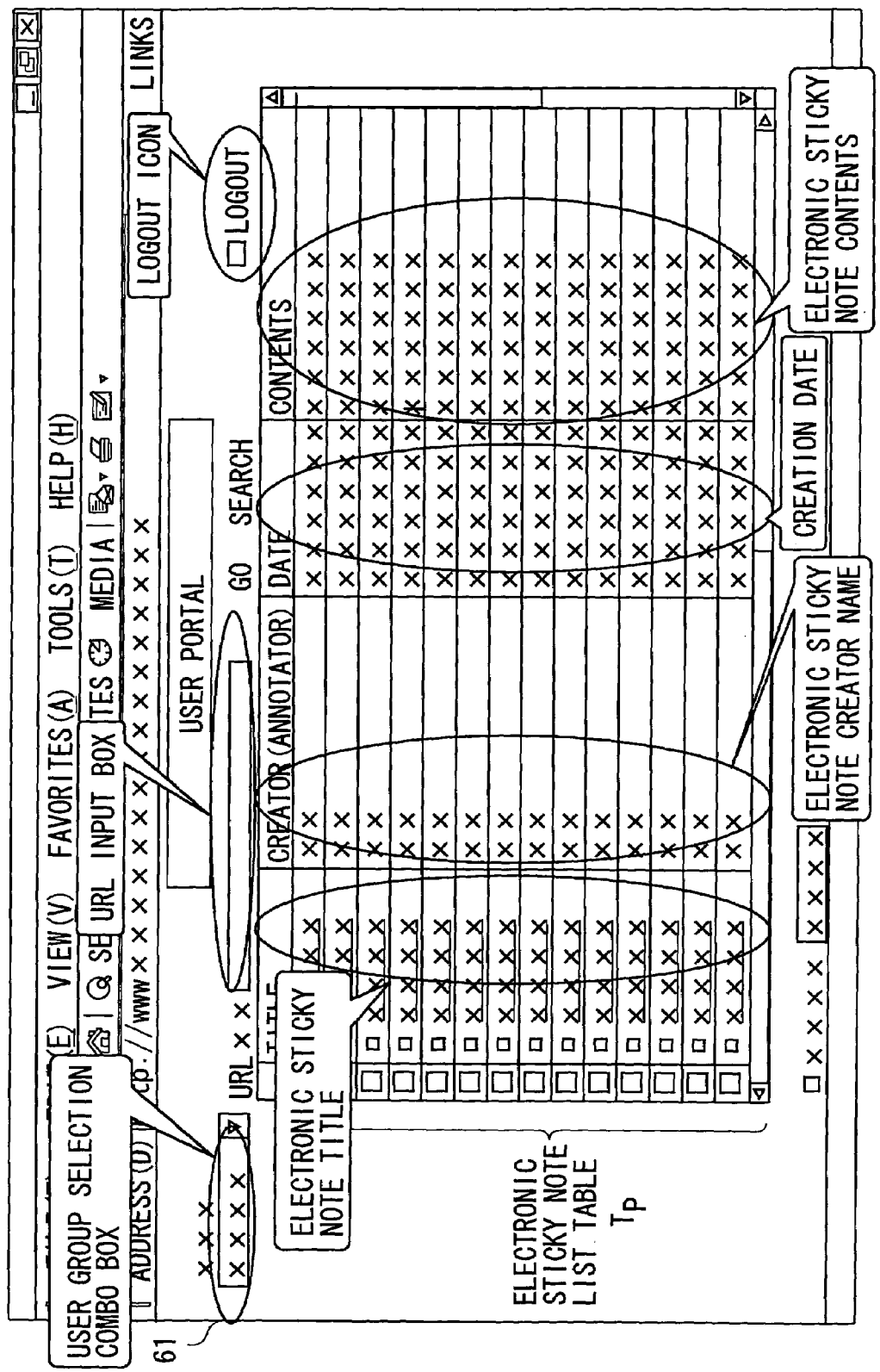
FIG. 4 is a diagram showing a user portal screen (for students).

FIG. 4 shows an example of the user portal screen. The user portal screen has a script Sp buried therein and the browser reads the user portal screen to execute the script Sp. The script Sp fetches from the user management server 1 a list of user groups to which this user belongs, and displays the list in a select box (combo box) 61. The user chooses a user group to use (for example, Group 1) in the select box 61. The script Sp requests a list of electronic sticky note data associated with the chosen user group from the electronic sticky note management server 5 and, upon receiving electronic sticky note information from the electronic sticky note management server 5, displays the information as an electronic sticky note list table Tp. At this point, the electronic sticky note management server 5 obtains user identification information (login ID in this embodiment) from permission information of the terminal 4, consults the electronic sticky note management table of FIG. 30 to obtain user groups to which the user belongs, presents the obtained user groups to the terminal 4, and provides the terminal 4 with electronic sticky note data that has GROUP_ID matching that of the group chosen in the select box (G1 if Group 1 is selected). Of the electronic sticky note data, the script Sp displays the title, creator, written date, and contents of the electronic sticky note in the electronic sticky note list table Tp with one row holding one electronic sticky note data.

The script Sp has a function of displaying the electronic sticky note list table Tp sorted by items, enabling a user to find an electronic sticky note efficiently. A link to the corresponding learning material page is set in the title of each electronic sticky note and the screen jumps to the learning material page by clicking on the title. Alternatively, a user may explicitly input the URL of a desired learning material in a URL input box and click on a go button to call up the learning material screen. It is also possible to present to a user a list of learning materials obtained by the user in the past or learning materials hitherto untouched by the user along with links to those learning materials, so that the user clicks on one of the links to call up a desired learning material page.

When notified of a jump to a learning material page, in other words, when receiving a request to provide a learning material from one of the terminals 4, 4, 4 . . . and 9, the system S performs processing below in order to present a learning material D1 in a format that allows users to input an electronic sticky note.

Assume that the URL of the learning material D1 is the following URL-1:

http://www.kyouzai-server-2.com/kyouzai-D1.html . . . URL-1

Then a learning material D1\*, which is the learning material D1 in a format that allows users to input an electronic sticky note, is accessed at the following URL-2:

http://www.henkan-server-3.com/cgi/transpage.cgi?url=http%3A%2F%2Fwww.kyouzai-server-2.com%2Fkyouzai-D1.html&=4&comment=0 . . . URL-2 wherein http://www.kyouzai-server-2.com is the URL of the learning material management server 2 which stores the learning material D1, a file specified by /kyouzai-D1.html is the learning material D1, http://www.henkan-server-3.com is the URL of the document conversion server 3, and transpage.cgi is the CGI on the document conversion server that is activated with the URL of the learning material D1 as an argument url. Other arguments of the CGI are user groups to which the users belong and an electronic sticky note displayed.

A user can belong to plural user groups, and therefore specifies, by "group", which user group's electronic sticky note is to be displayed. "Comment" is set in the case of specifying a particular electronic sticky note on the learning material D1. For instance, the setting of "comment" may be such that a learning material page is displayed while displaying only a particular electronic sticky note and no other electronic sticky notes, or such that a particular electronic sticky note blinks on and off or is displayed in some accentuated fashion. "Comment=0" in the URL-2 is the setting for when no particular electronic sticky note is specified and every displayable electronic sticky note is displayed on the learning material page.

The CGI, transpage.cgi, presents the functions of the document acquisition unit 31, the document analyzing unit 32 and the document conversion unit 33, and operates in conjunction with the script storing unit 34. Based on the received argument url (=URL-1), transpage.cgi fetches the learning material D1 from the learning material management server 2 (the document acquisition unit 31). The learning material D1 is then read by the document analyzing unit 32. In the case where the learning material D1 is in the HTML format, HTML tags are read by an XML parser to make the document accessible as a DOM (Document Object Model). Thereafter, the document conversion unit 33 performs the following processing:

(1) Conversion of every link in the HTML data into a URL that includes transpage.cgi (e.g., the URL-2).

(2) Embedding of a script Sf for adding an electronic sticky note and for display, or addition of <SCRIPT> tags for reading the script Sf.

(3) Embedding of an event for starting up the script Sf. For example, addition of an onload event and an onmousedown event to <BODY> tags.

(4) Addition of a navigation bar (FIG. 6), or embedding of an additional script, or addition of <SCRIPT> tags for reading an additional script.

Figure 5:
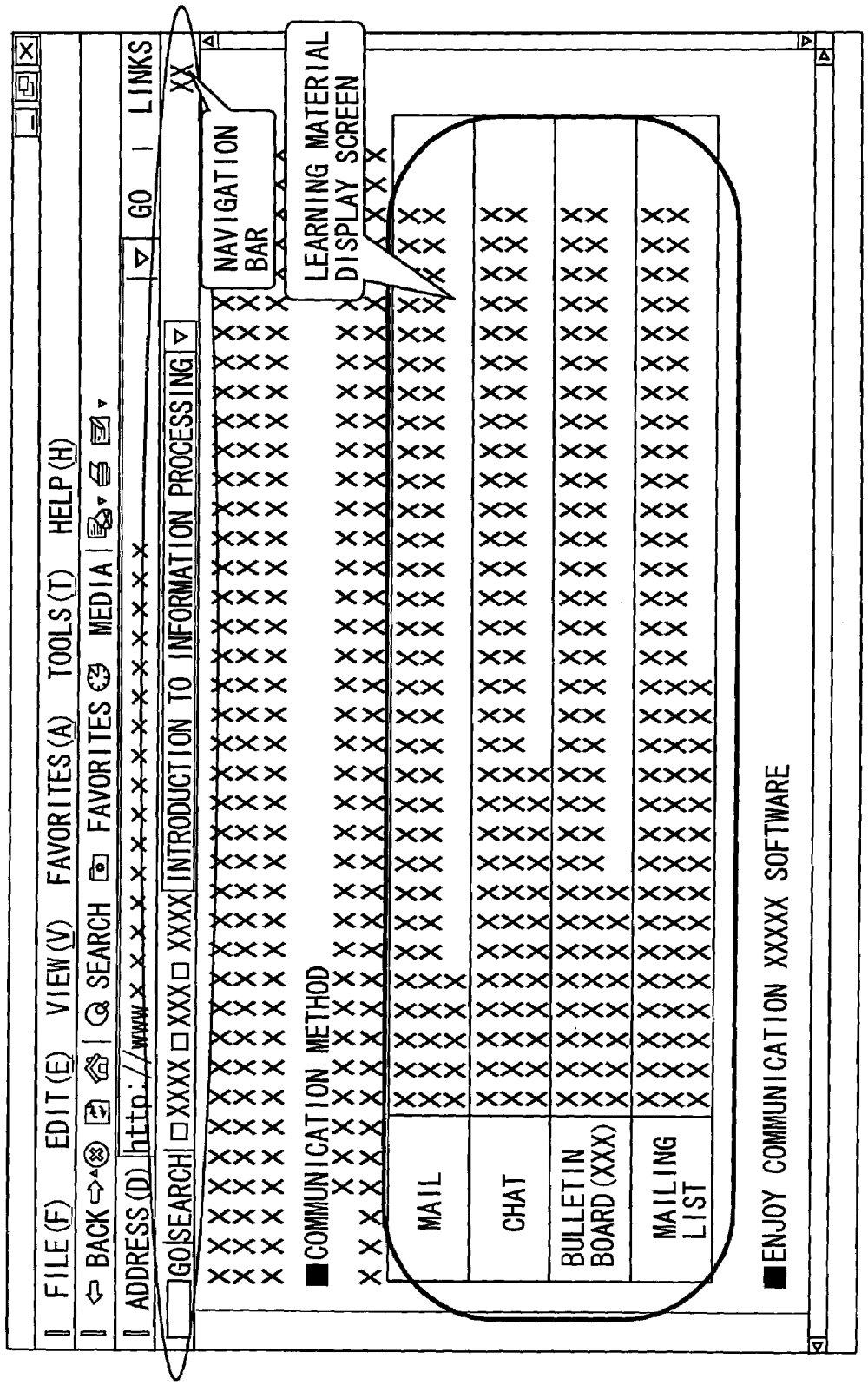
FIG. 5 is a diagram showing a learning material D1* display screen.
Figure 6:
FIG. 6 is a diagram showing a navigation bar.

(5) Division of text into sub-blocks. For instance, text is divided at each <BR> tag (division at each line break) or at each period (division by sentences), and each section of the divided text is sandwiched by <SPAN>~</SPAN> to obtain a sub-block. (1) is for enabling users to utilize an electronic sticky note on a page to which a user is brought by a jump that is performed by a click of a link on the converted document. (2) is for giving the learning material D1 a function for electronic sticky note. (3) and (4) are for initializing the script Sf and providing a user interface. (5) is processing for controlling the granularity of an area where an electronic sticky note is to be attached. The converted learning material D1* is shown in FIG. 5 and the navigation bar added by (4) is shown in FIG. 6.

The navigation bar has a URL input box (see the portal screen), a check box for choosing to or not to display electronic sticky notes, a handwriting inputting check box, a user group switching selection box, a button for jumping to a user portal, etc. Manipulation of the GUI puts corresponding functions in the script Sf into operation.

The student browser 41 reads and displays the converted learning material D1*, starting up the script Sf embedded in HTML data of the learning material or the script Sf a link to which is specified by src attributes of <SCRIPT> tags. The script Sf checks the login state of a user and, when the user is not logged in, calls up the login screen. Then the electronic sticky note management server 5 is requested to provide electronic sticky note information specified by url. Of electronic sticky notes that have url of PAGE_URL and GROUP_ID specified by "group", the electronic sticky note management server 5 provides electronic sticky notes that meet one of the following conditions to the user terminal 4 as electronic sticky notes available to this user.

USER_ID is of the login ID of the user (an electronic sticky note created by this user).

The group member attribute of PERMISSON is r and PARENT_ID=0 (an electronic sticky note disclosed).

The group member attribute of PERMISSON is r and PARENT_ID≠0, and the user can view a quoted electronic sticky note specified by PARENT_ID.

Figure 7:
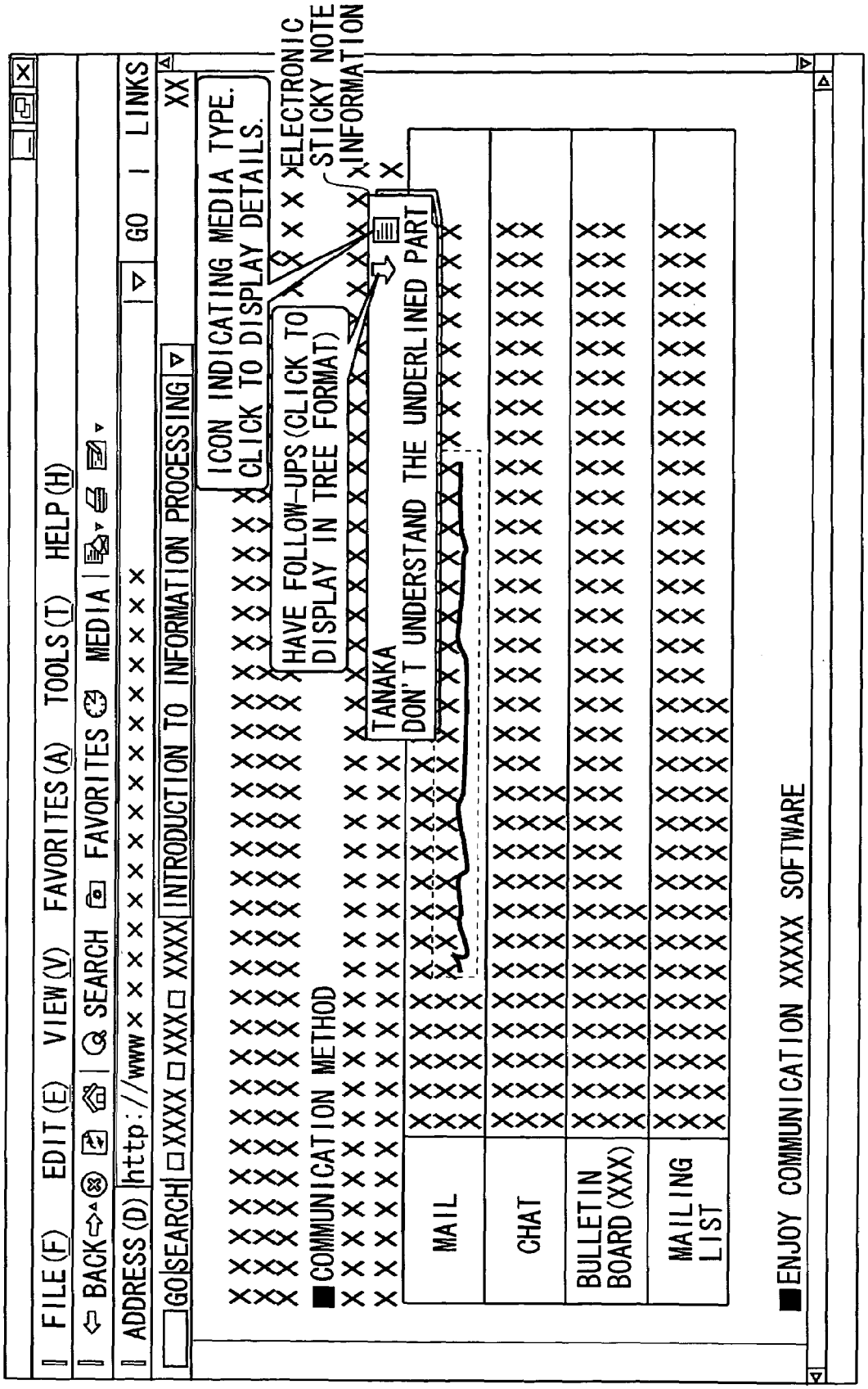
FIG. 7 is a diagram showing how an electronic sticky note is displayed.
Figure 10:
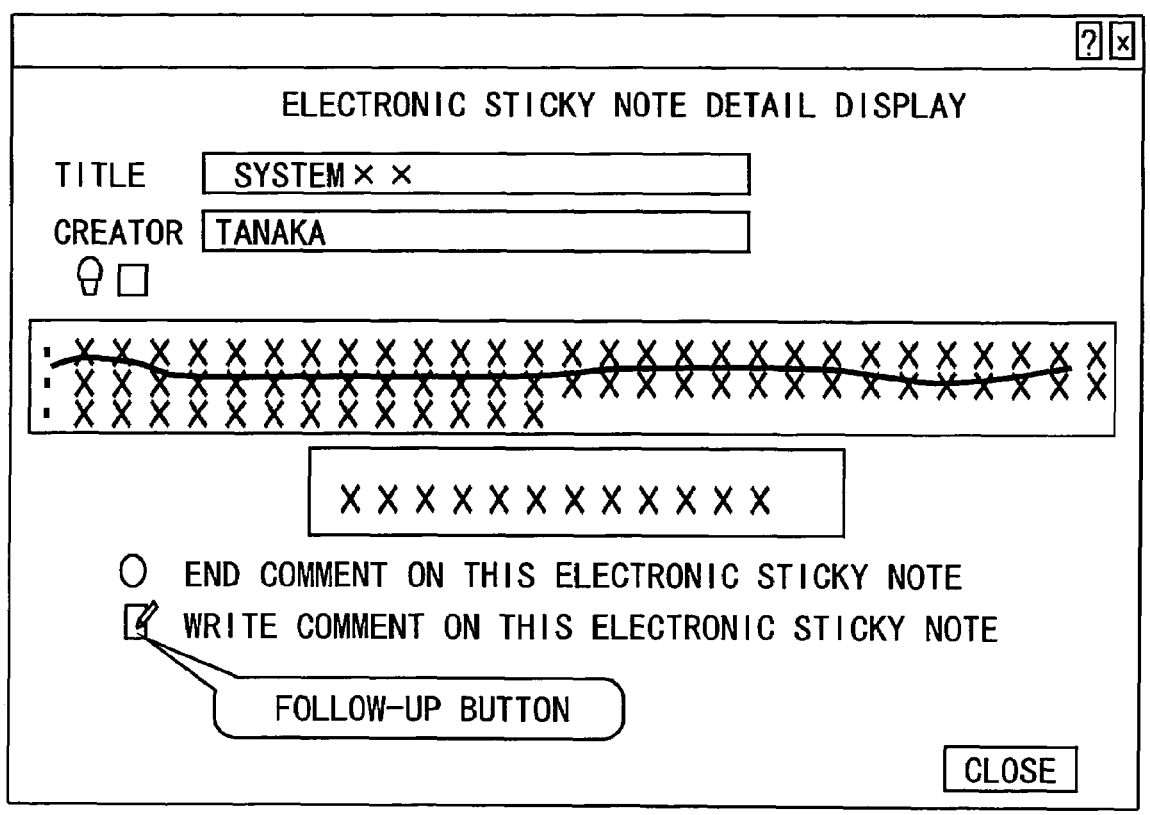
FIG. 10 is a dialogue showing an electronic sticky note detail display dialogue.

After electronic sticky note data is obtained, the browser 41 superimposes the obtained electronic sticky note data on the HTML document drawn (FIG. 7). For superimposed display, (1) the browser 41 obtains the position of an HTML object at a path position specified by TAG_PATH, (2) adds an offset value of TAG_OFFSET to the object position to calculate an electronic sticky note drawing position, (3) an HTML tag which displays the contents of TAG_DATA or TAG_COMMENT depending on TAG_TYPE (for example, an <IMG> tag when TAG_TYPE is photo) is created while specifying style attributes such that the tag is placed at the electronic sticky note drawing position, and is inserted in the HTML document. At the same time, TAG_AUTHOR, TAG_TITLE and TAG_COMMENT maybe displayed as well as an icon indicating the electronic sticky note type (TAG_TYPE), an icon for displaying an electronic sticky note detail display dialogue (FIG. 10), an icon indicating the presence or absence of an electronic sticky note that quotes the electronic sticky note displayed, an icon for jumping to a URL contained in TAG_COMMENT with an electronic sticky note specified (a jump in the URL-2 format), and one for deleting an electronic sticky note displayed. These data and icons can be displayed by, for example, creating <DIV> tags, implanting tags for drawing the information in the created <DIV> tags, and inserting the <DIV> tags in the HTML document. Shown in FIG. 7 is an example of drawing an electronic sticky note 1 of FIG. 30. In FIG. 7, a portion indicated by dotted lines is an image specified by TAG_DATA. Simultaneously displayed are TAG_AUTHOR and TAG_COMMENT, an icon indicating the presence of a quotation electronic sticky note, and a media type icon (handwriting) to which a link to display an electronic sticky note detail dialogue is attached.

The electronic sticky note detail display dialogue displays the entirety of or a part of electronic sticky note information. When a script in the electronic sticky note detail display dialogue displays the contents (text) of TAG_COMMENT, whether or not the text contains a URL is detected. A section of the text that constitutes a URL is associated with a URL for converting the contained URL into one that can handle electronic sticky notes, so that a click on the URL text portion opens the document that can handle electronic sticky notes in a separate window or shifts the learning material display screen.

To add an electronic sticky note, a user manipulates a GUI 412. A user clicks the left mouse button at a place on the screen where an electronic sticky note is desired to be added while pressing an ALT key on the keyboard. This activates an electronic sticky note adding function of the script Sf from the inside of an onmousedown event handler which has been set up by transpage.cgi. The script Sf obtains an HTML object at the mouse click position, and sets a path of the object for TAG_PATH. The script Sf sets, for TAG_OFFSET, the mouse click position of this object on a local coordinate plane in pixel coordinates or in percentage (ratio) where 100% represents the width and length of the object. Then the script Sf extracts a keyword from a text portion in the object (innerText) and registers the keyword to TAG_KEYWORD (alternatively, the electronic sticky note management server 5 may extract a keyword upon registration of an electronic sticky note). The script Sf also sets the URL and title of the current learning material data for PAGE_URL and PAGE_TITLE, sets USER_ID and TAG_ANNOTATOR in accordance with the current user attributes, and sets the current time for TAG_DATE. The rest of the items are set by the user upon opening an electronic sticky note creating dialogue box (FIG. 8). To add other media than text to an electronic sticky note, for example, images, animation, and sounds, a path to this media file in the terminal 4 or 9 is specified in the electronic sticky note creating dialogue box and then uploaded onto the media management server 6 by a script in the dialogue. In this case, the URL after the upload is registered to TAG_DATA. Text inputted in a comment field of the dialogue box makes TAG_COMMENT. A keyword is extracted from text contained in TAG_COMMENT and in TAG_TITLE to be added to TAG_KEYWORD (the extraction may be performed by the electronic sticky note management server 5 instead). A level of importance (PRIORITY) can be set to an electronic sticky note.

For instance, five levels of importance are set with Level 1 representing "low importance", Level 2 representing "rather low importance", Level 3 representing "normal importance", Level 4 representing "great importance", and Level 5 representing "urgent". Icons indicating levels of importance (e.g., light bulbs of varying brightness) may be employed instead of numbers, so that a user can specify a degree of importance intuitively.

PERMISSION of an electronic sticky note may be specified explicitly by a user in the electronic sticky note creating dialogue box, or may be automatically specified by searching a PERMISSION table (FIG. 34) with a STANCE attribute as the key. To give an example of the latter case, "rdf r-f - - - " is automatically set to an electronic sticky note having "question" as its STANCE attribute, namely, an electronic sticky note that is a question to a teacher, "rdf - - - rdf" is set to an electronic sticky note having "discussion" as its STANCE attribute, namely, an electronic sticky note that is to share a topic with other members, and "rdf - - -" is set to an electronic sticky note having "memorandum" as its STANCE attribute, namely, an electronic sticky note that is a note to self. The PERMISSION table may cooperate with the script Sf or with the electronic sticky note management server 5.

After electronic sticky note information is inputted in the electronic sticky note creating dialogue box, an OK button 62 is clicked on to register the electronic sticky note data in the electronic sticky note management server 5. Then all electronic sticky notes including the one added to the learning material screen are displayed again.

Figure 9:
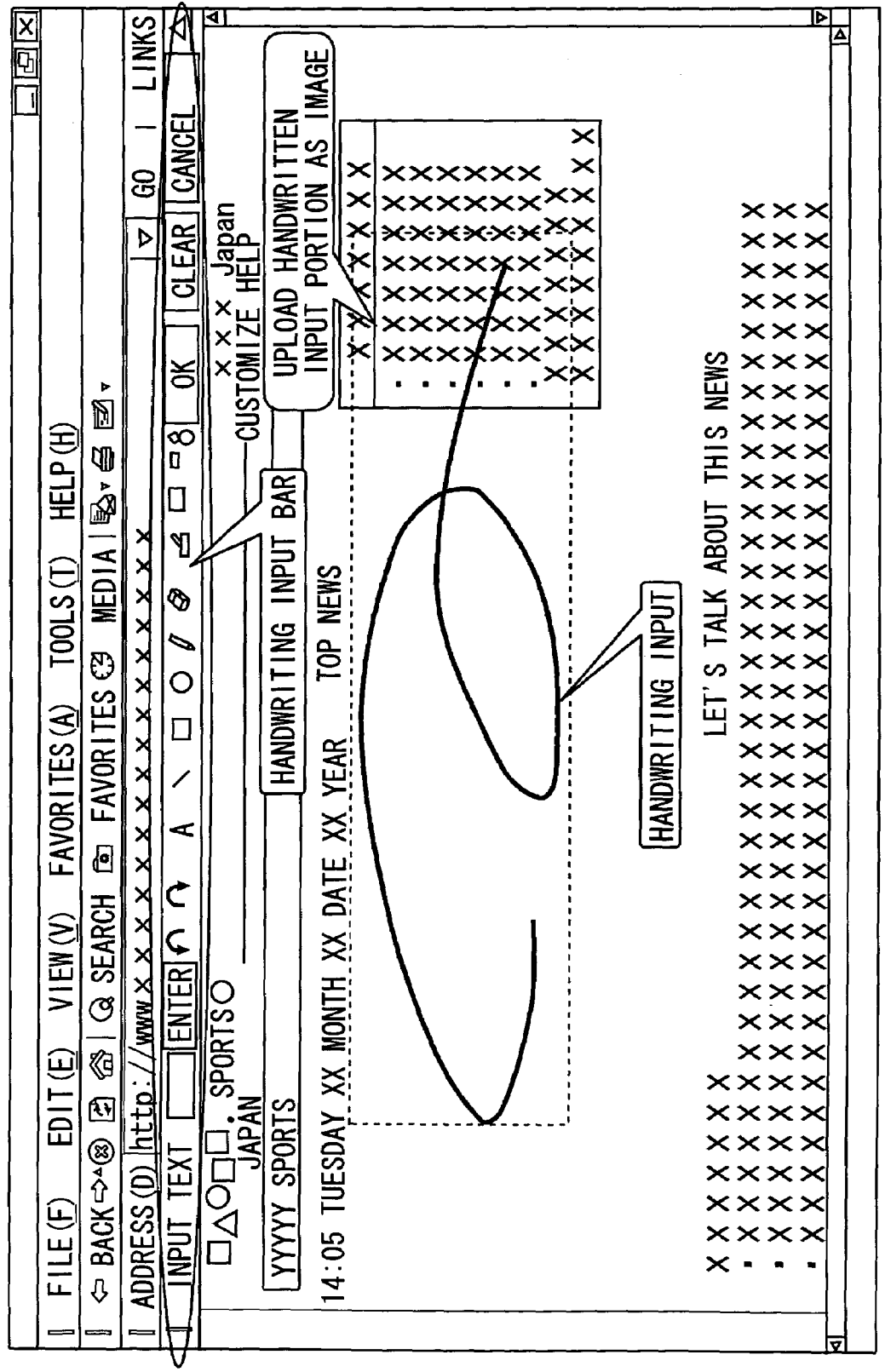
FIG. 9 is a diagram showing a handwriting input screen.

A handwritten electronic sticky note (TAG_TYPE=hand) can be created also by checking a handwriting check box on the navigation bar (FIG. 9). When the handwriting check box is checked, a handwriting input bar is displayed in place of the navigation bar enabling a user to draw a bit map directly on the screen with the use of a GUI such as a mouse or a stylus. The handwritten text or drawing is made into an image in a rectangular area that covers the handwriting input range, and the image data is uploaded onto the media management server 6. Other type of information can be set in the electronic sticky note creating dialogue box as in normal electronic sticky notes.

To create a follow-up electronic sticky note for an electronic sticky note created by the user himself/herself or by other members, the user specifies the original electronic sticky note displayed on the screen and simultaneously presses an ALT key and clicks on the left mouse button, or the user clicks on a follow-up button in the electronic sticky note detail display dialogue with the mouse to open the electronic sticky note creating dialogue box where follow-up data is inputted. The process of creating a follow-up electronic sticky note differs from the process of creating an electronic sticky note that is attached directly to a document in the following points:

TAG_ID of the original electronic sticky note is set to PARENT_ID.

TAG_PATH and TAG_OFFSET of the original electronic sticky note are set to TAG_PATH and TAG_OFFSET of the follow-up electronic sticky note, respectively.

TAG_KEYWORD of the original electronic sticky note is added to key words that are extracted for the follow-up electronic sticky note. In the case where the number of keywords that can be registered is limited, the keywords extracted for the follow-up electronic sticky note are given priority over those of the original electronic sticky note.

In the case of TAG_TYPE=text, TAG_COMMENT can be quoted if the type of the original electronic sticky note is text.

In the case of TAG_TYPE=hand, a medium specified by TAG_DATA can be quoted if the type of the original electronic sticky note is photo or hand whereas a character string can be quoted if the type of the original electronic sticky note is text.

Figure 11:
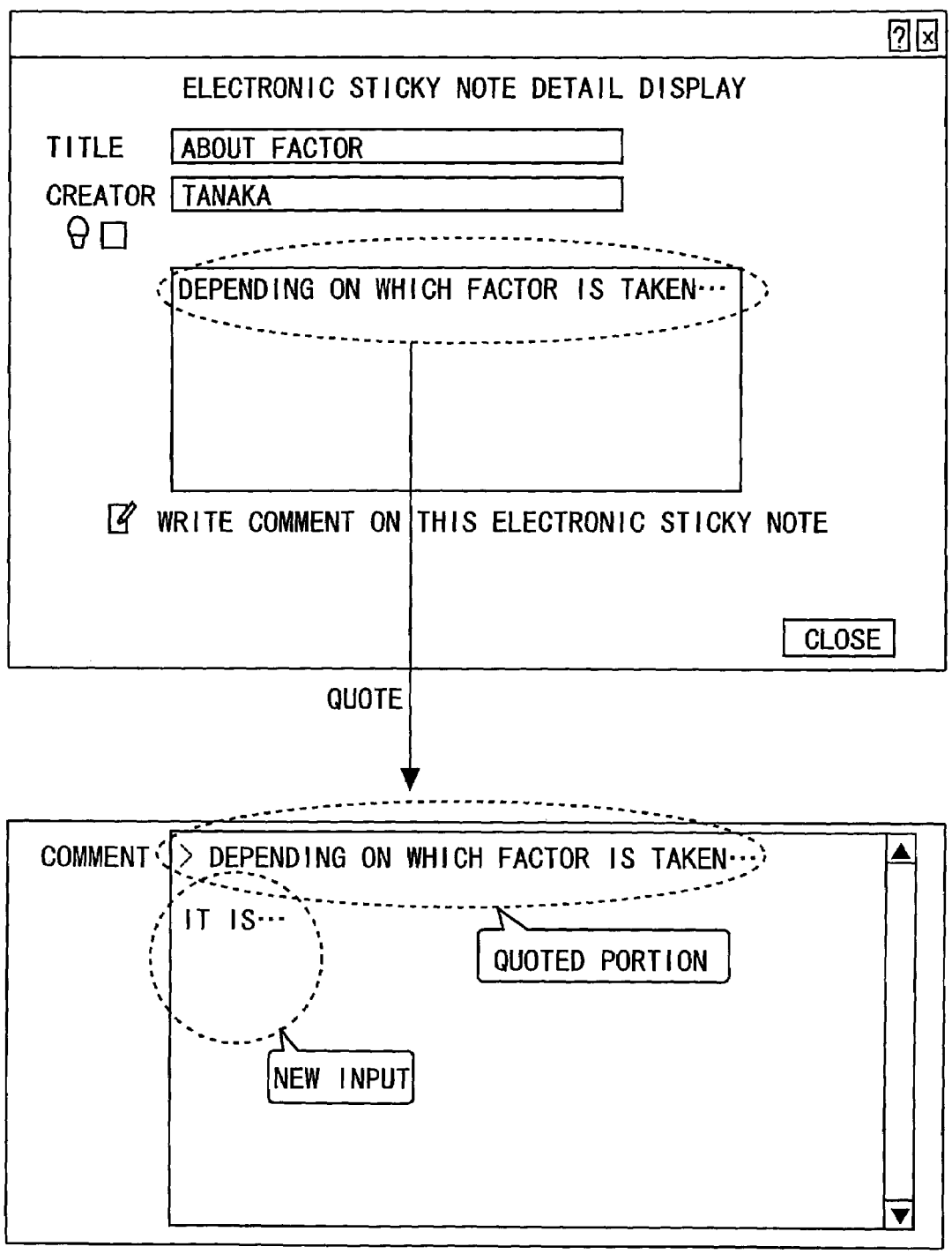
FIG. 11 is an explanatory diagram for when text information is quoted.

A quotation button in the electronic sticky note creating dialogue is clicked on to quote the original electronic sticky note. The quotation button is effective only when the original electronic sticky note can be quoted. In the case of TAG_TYPE=text, a click on the quotation button makes the contents of TAG_COMMENT inserted and displayed in the comment field with a quotation symbol such as ">" attached, or in a different color (FIG. 11) only when the type of the original electronic sticky note too is text. The user creates the follow-up electronic sticky note by editing the quoted portion suitably and inputting additional text.

Figure 12:
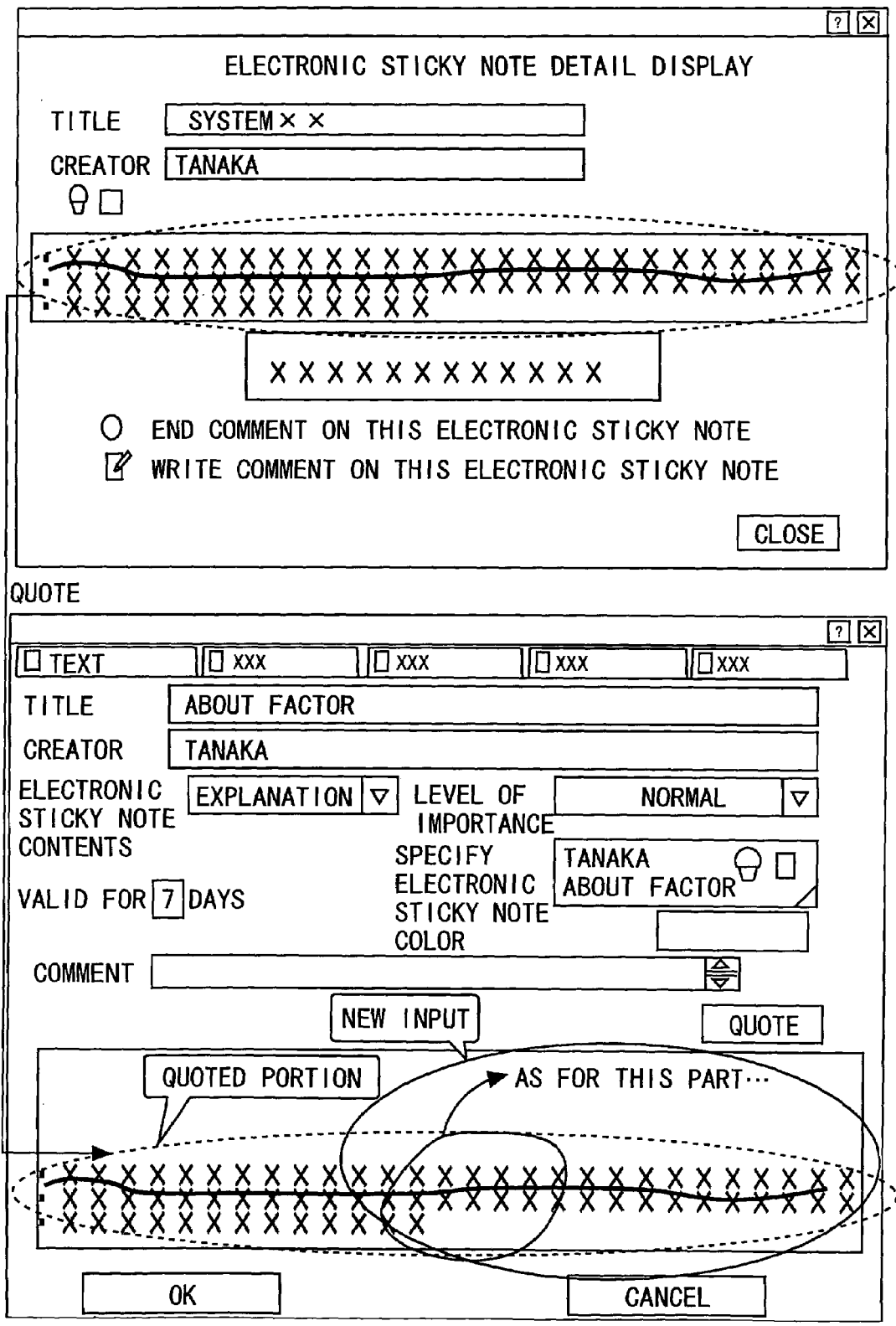
FIG. 12 is an explanatory diagram for when handwritten information is quoted.

In the case of TAG_TYPE=hand, a click on the quotation button creates initial values of the handwritten image by capturing as an image a comment field for displaying TAG_COMMENT when the type of the original electronic sticky note is text, and by capturing an image stored at a URL in TAG_DATA when the type of the original electronic sticky note is photo or hand (FIG. 12).

In order to make it easier for a viewer to discern the added handwritten portion from the captured image, the captured image may be converted into a monochrome image, adjusted in color saturation and brightness, and changed in color tone. The relation between an electronic sticky note and its follow-up electronic sticky note is displayed in the electronic sticky note on the learning material screen, or in an electronic sticky note list dialogue (FIG. 13), which is displayed by clicking on an icon (downward arrow) indicating the presence of a follow-up in the electronic sticky note detail display dialogue.

The list is displayed as a simple list or in tree format in chronological, or reverse chronological, order. The tree display is created based on TAG_PARENT, and illustrates the question-answer relation between a student and a teacher or visualizes the flow of discussion among students.

Electronic sticky note data created in the user terminal 4 is accumulated in the electronic sticky note management server 5. The electronic sticky note management server 5 is composed of the electronic sticky note management unit 51, the electronic sticky note storing unit 52, the change notifying unit 53, the electronic sticky note mail registration unit 54, the electronic sticky note searching unit 55, the (similar) electronic sticky note searching unit 56, and the electronic sticky note analyzing unit 57. The electronic sticky note storing unit 52 stores the electronic sticky note management table (FIG. 30), and is implemented by a relational database or the like. The electronic sticky note management unit 51 is a program for manipulating the electronic sticky note storing unit 52, and manipulates the electronic sticky note management table based on a request made by a user to add, delete, or provide an electronic sticky note.

The change notifying unit 53 is a program run, usually in a sleep state, on the electronic sticky note management server 5. The change notifying unit 53 wakes up as an electronic sticky note is added to the electronic sticky note storing unit 52 and, if PRIORITY of the electronic sticky note added is Level 5 (urgent), creates notification mail addressed to every user that is allowed to view this electronic sticky note and sends the mail via the mail server 7 thereby notifying the corresponding users of the addition of an urgent electronic sticky note.

Notification mail contains the URL of the electronic sticky note in question, the title of the electronic sticky note (TAG_TITLE), TAG_COMMENT, etc., and a unique alarm ID (for example, TAG_ID to be notified) is buried in a section of Subject. A user who has received the notification mail clicks on the contained URL to check the electronic sticky note out.

If for some reason the user cannot view the electronic sticky note by clicking on the URL, the user can guess the contents of the electronic sticky note from the body of the notification mail, or can hit a reply button of the notification mail. In the latter case, the electronic sticky note mail registration unit 54 accesses the mail server 7 to obtain the reply mail and registers the reply mail as an electronic sticky note in the electronic sticky note storing unit using the ID of the user that has replied.

The electronic sticky note created from the reply mail has, as TAG_PARENT, the ID of the urgent electronic sticky note which is deducted from the alarm ID contained in Subject of the reply mail, sets the user that has replied as USER_ID and TAG_ANNOTATOR, and has the mail body as TAG_COMMENT.

In the case where the notification mail has an attached file, the attached file is uploaded onto the media management server 6 and the media type is estimated from the extension of the attached file to determine TAG_TYPE. The URL of the uploaded file is set as TAG_DATA. This way an answer or follow-up in the form of photographs, motion pictures, audio, or text from a camera-equipped mobile phone or the like can be given to an urgent electronic sticky note in an environment without access to WWW.

The change notifying unit 53 may wake up as scheduled in advance, and may create and send via e-mail a summary of electronic sticky notes that have been added since the last time the change notifying unit 53 is started up. For instance, a user terminal can be programmed to receive a summary once a day, and the change notifying unit 53 lists up and delivers via e-mail the URL, TAG_TITLE, and TAG_COMMENT of electronic sticky notes available to every user terminal that is programmed as such. Thus the system can warn users against overlooking electronic sticky notes.

An electronic sticky note searching function and an electronic sticky note analyzing function, in addition to the functions described above, are available to the teacher.

Given below is the implementation of the system that is viewed from teacher's side.

The teacher accesses the learning material management server 2 at the following URL-3 in order to open the learning material D1 at the URL-1:
http://www.henkan-server-3.com/cgi/
transpage2.cgi?url=http %3A %2F %2Fwww.kyouzai-server-2.com %2Fkyouzai-D1.html&group=4&comment=0 . . . URL-3

In the URL-3, transpage2.cgi is the CGI that has a similar function as transpage.cgi. The only difference between the two is that transpage2.cgi uses a teacher script St instead of the script Sf. The script St is, similar to the script Sf, a script stored in the script storing unit 34 but differs from the script Sf in the following points:

Has a function of choosing one student from a user group and selectively displaying electronic sticky notes created by the teacher and electronic sticky notes set by the chosen student to be shared with the teacher (one-to-one display function)

Has a function of putting together, for each sub-block of a document, to display, electronic sticky note that are added by students to be shared with the teacher instead of displaying the electronic sticky notes directly on the learning material (one-to-many display function).

Has an interface to access the electronic sticky note searching unit 55 (electronic sticky note searching function).

Has an interface to access the similar electronic sticky note searching unit 56 (similar electronic sticky note searching function).

Has an interface to access the electronic sticky note analyzing unit 57 (electronic sticky note analyzing function).

Has an interface to access the understanding degree judging unit 58 (understanding degree judging function).

Figure 14:
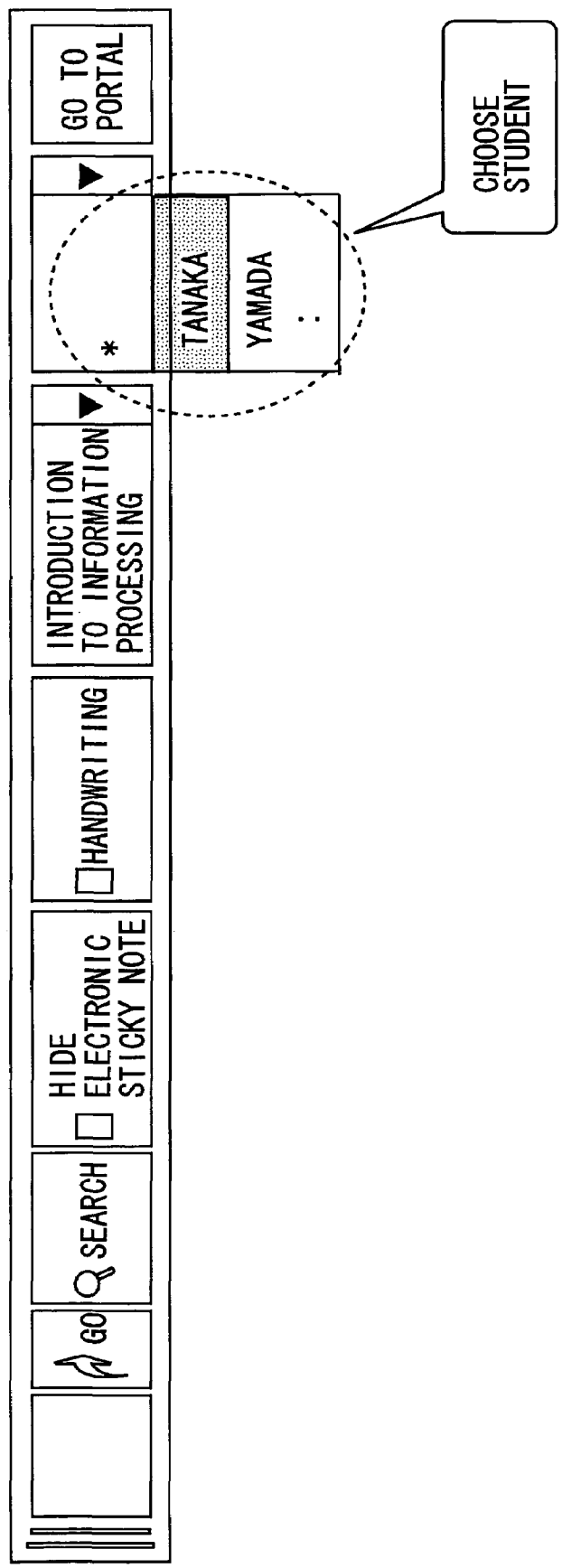
FIG. 14 is a diagram showing a navigation bar (for teachers).

The first and second display functions are functions that enable the teacher to communicate with a large number of students. For a selective communication with a single student, the one-to-one display function is employed. To grasp students' collective understanding degree, the one-to-many display function is employed. The script St therefore adds a student selection box for selecting a student to the navigation bar (FIG. 14).

Selections in the student selection box are changed in conjunction with a choice made in a user group selection box. When a user group is selected in the user group selection box, the script St accesses the group member management table and user management table of the user management server 1 to extract users (students) from which a choice is to be made and display the extracted selections in the student selection box.

The symbol "*" in the student selection box indicates that no student is selected. Choosing the symbol "*" means to use the one-to-many display function. On the other hand, choosing one of the students means to use the one-to-one display function for the student chosen. In this case, the script St fetches, from the electronic sticky note management server 5, electronic sticky notes that are to be shared between this user (teacher) and the student chosen out of electronic sticky notes available to the teacher leaving electronic sticky notes of other students. The subsequent operation of the script St is identical with that of the student script Sf, and includes display/creation/erasure of electronic sticky notes and a follow-up to the electronic sticky notes of the student chosen.

Figure 15:
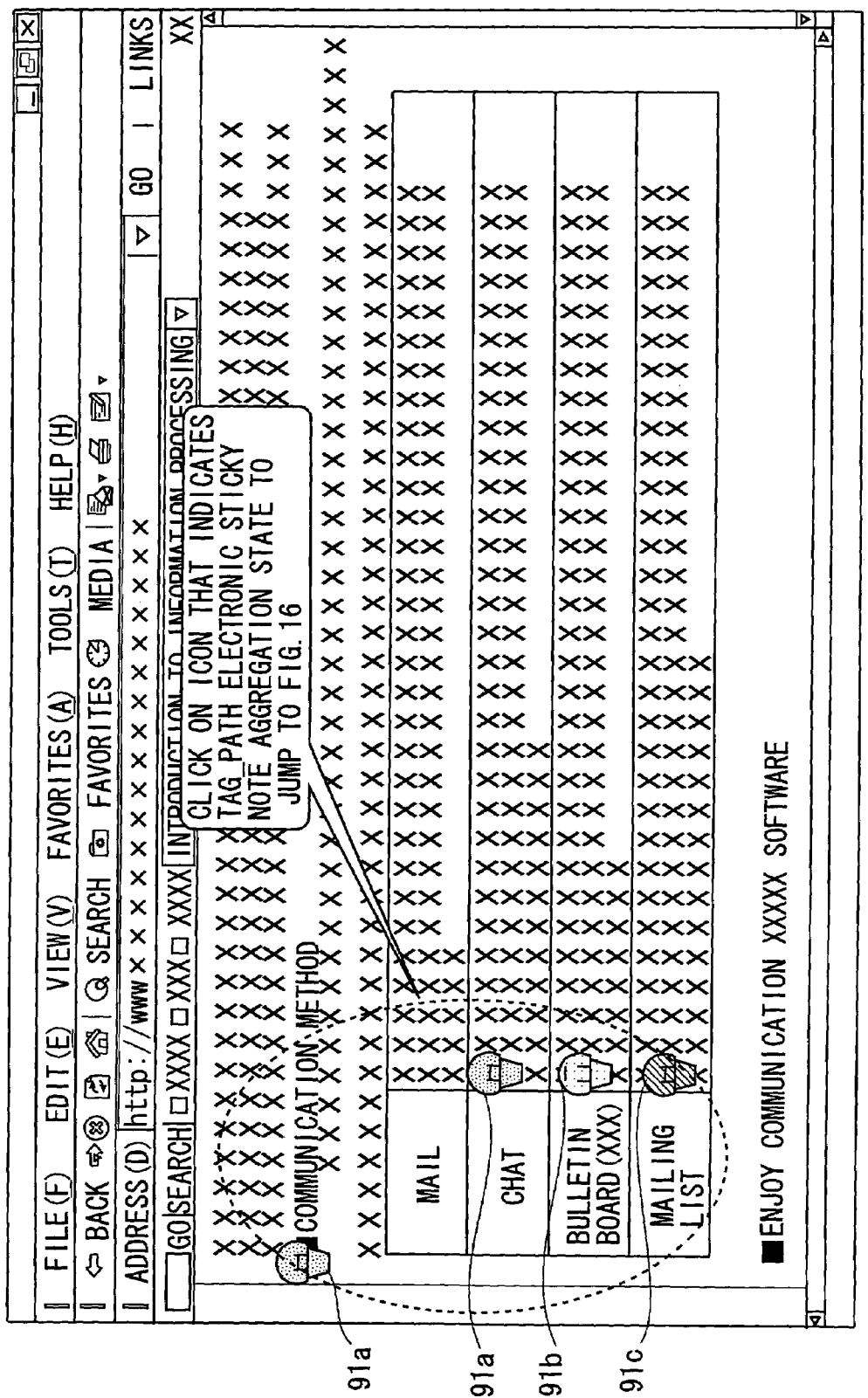
FIG. 15 is a diagram showing one-to-many display.

On the other hand, when one-to-many display is selected, electronic sticky notes are put together for each sub-block of a learning material document for display. The script St fetches, from the electronic sticky note management server 5, every electronic sticky note that has PAGE_URL and GROUP_ID of the learning material document that is to be displayed. Of the electronic sticky note data fetched, those that have the same TAG_PATH are associated with a sub-block positioned at this TAG_PATH, and icons 91a to 91c where a link is set to display an aggregation of electronic sticky notes that have the same TAG_PATH are displayed on this sub-block (FIG. 15).

Different icons may be used depending on the state of the aggregation (an aggregation of electronic sticky notes that have the same TAG_PATH). For instance, an icon of higher visibility is used for an aggregation of a greater number of electronic sticky notes that have the same TAG_PATH. To elaborate, the higher the element count, the bolder the icon color (red, for example), or the larger the icon size. Alternatively, the average PRIORITY of the aggregation of electronic sticky notes is obtained to change the icon visibility in accordance with the average PRIORITY obtained. An icon that reflects the trend of STANCE of the aggregation may also be employed (for example, an icon implying counter argument in the case where the number of electronic sticky notes about a "rebuttal" is the largest).

Figure 17:
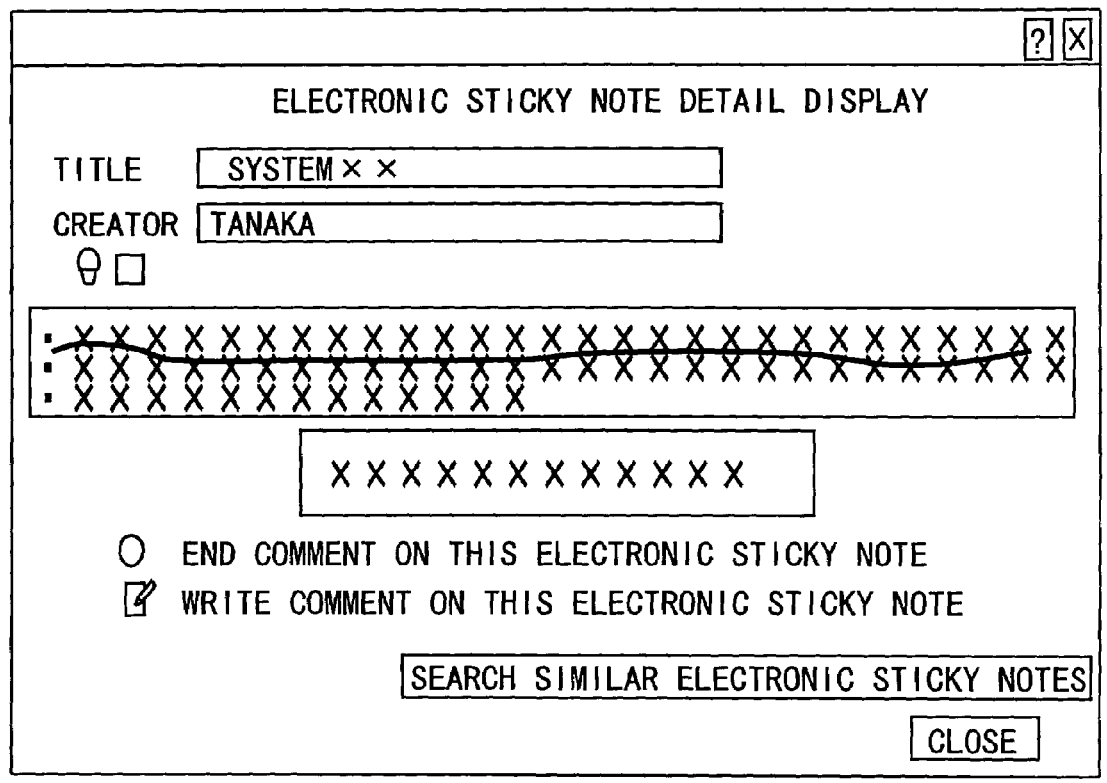
FIG. 17 is a diagram showing an electronic sticky note detail display dialogue (for teachers).
Figure 20:
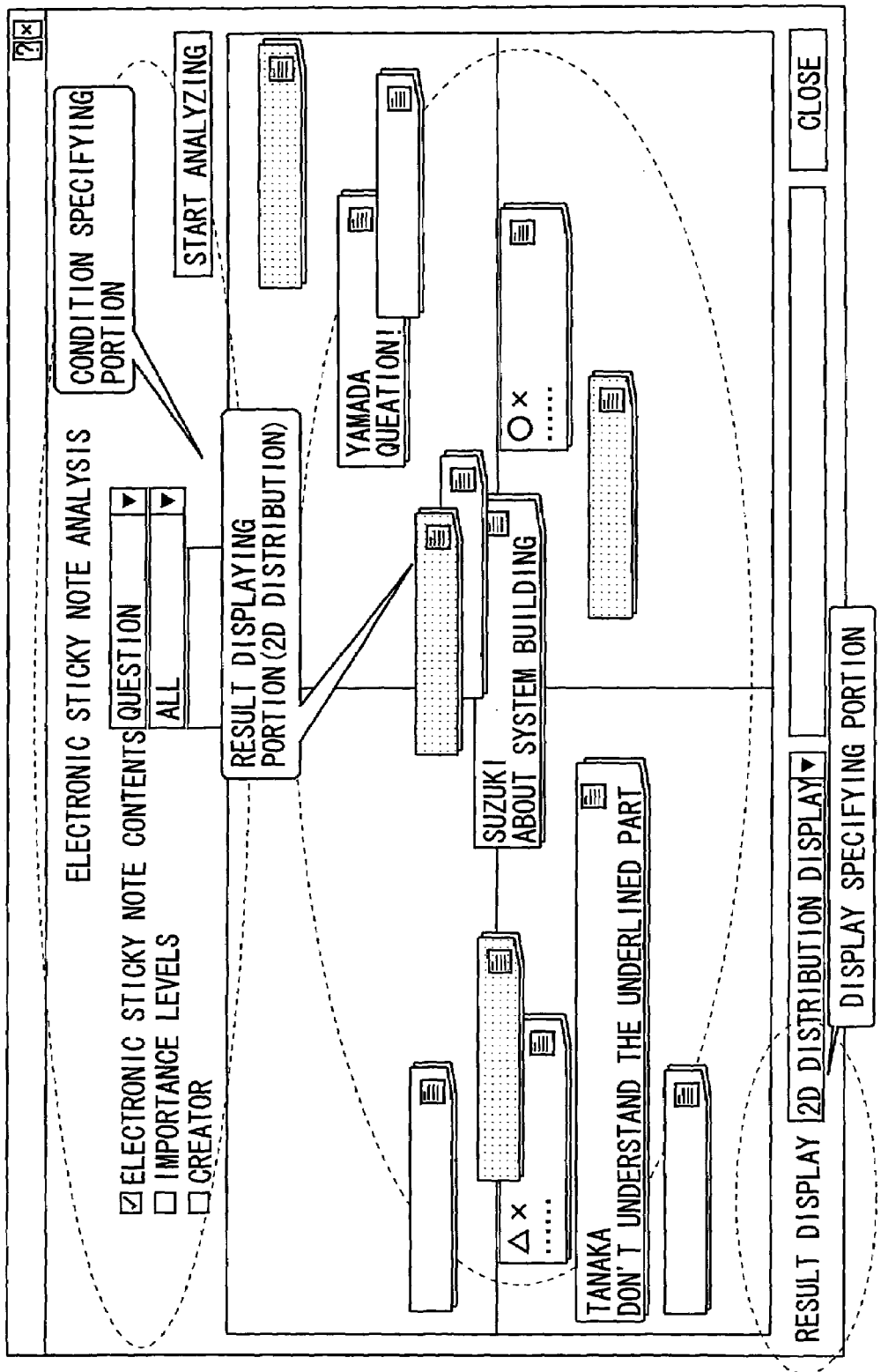
FIG. 20 is a diagram showing an electronic sticky note analysis dialogue (2D distribution display).
Figure 21:
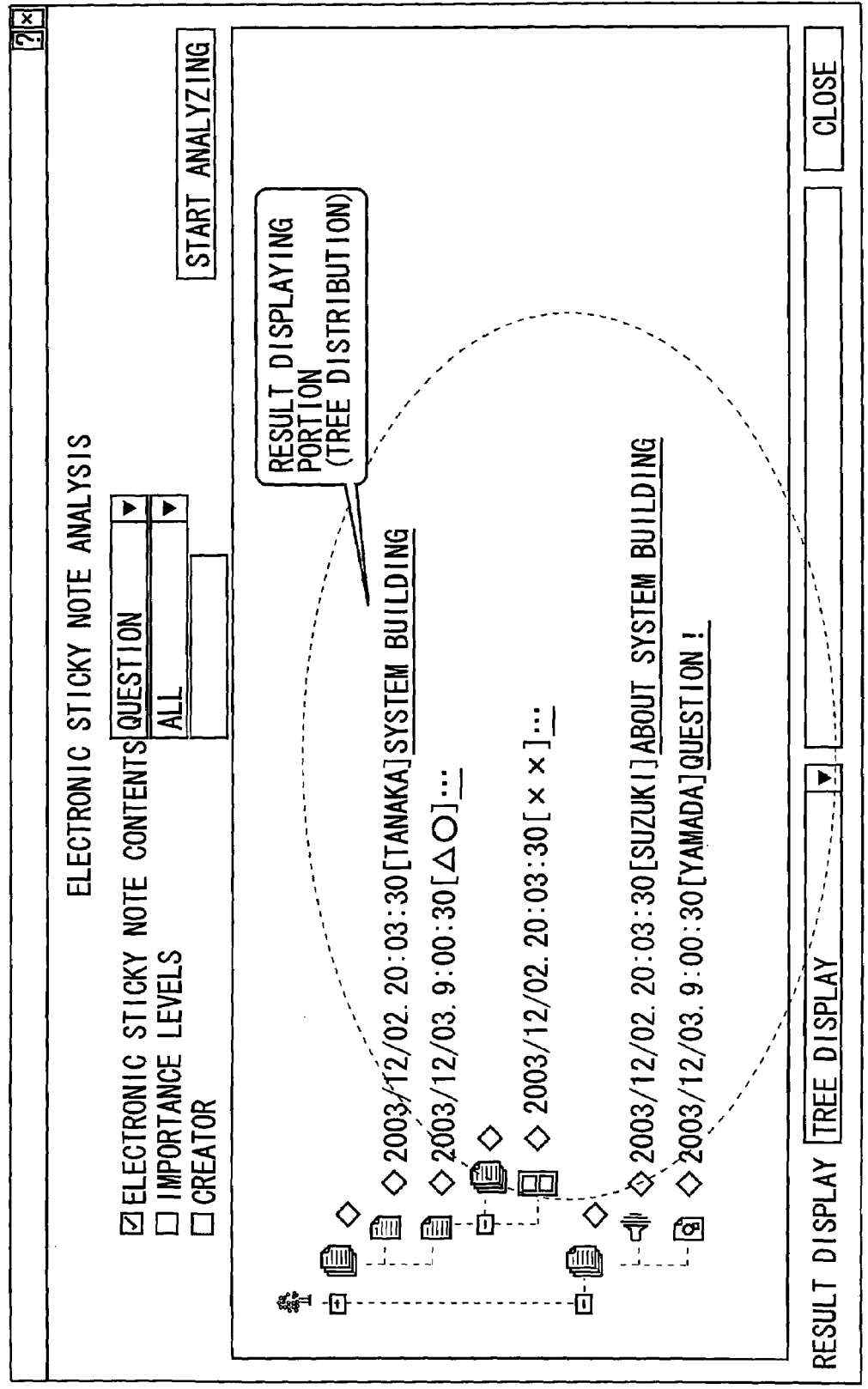
FIG. 21 is a diagram showing an electronic sticky note analysis dialogue (tree distribution display).

A click on a same TAG_PATH electronic sticky note aggregation icon opens a same TAG_PATH electronic sticky note list dialogue (FIG. 16). The same TAG_PATH electronic sticky note list dialogue is mostly similar to the electronic sticky note list dialogue box (FIG. 13), and is capable of displaying electronic sticky notes in chronological or reverse chronological order or in tree format. With a click of each electronic sticky note element on the dialogue, an electronic sticky note detail display dialogue (FIG. 17) for a teacher is displayed. The same TAG_PATH electronic sticky note list dialogue differs from the electronic sticky note list dialogue box in that there is more than one parent (more than one root electronic sticky note) when displayed in tree format, and that an analysis button is added. The difference between the electronic sticky note detail display dialogue for a teacher and the one for students is that a similar electronic sticky note search button is added. A click on the analysis button on the electronic sticky note list dialogue box for a teacher opens an electronic sticky note analysis dialogue, enabling the teacher to check the distribution of electronic sticky notes that have the same TAG_PATH in 2D distribution display (FIG. 20) and in tree distribution display (FIG. 21).

Figure 18:
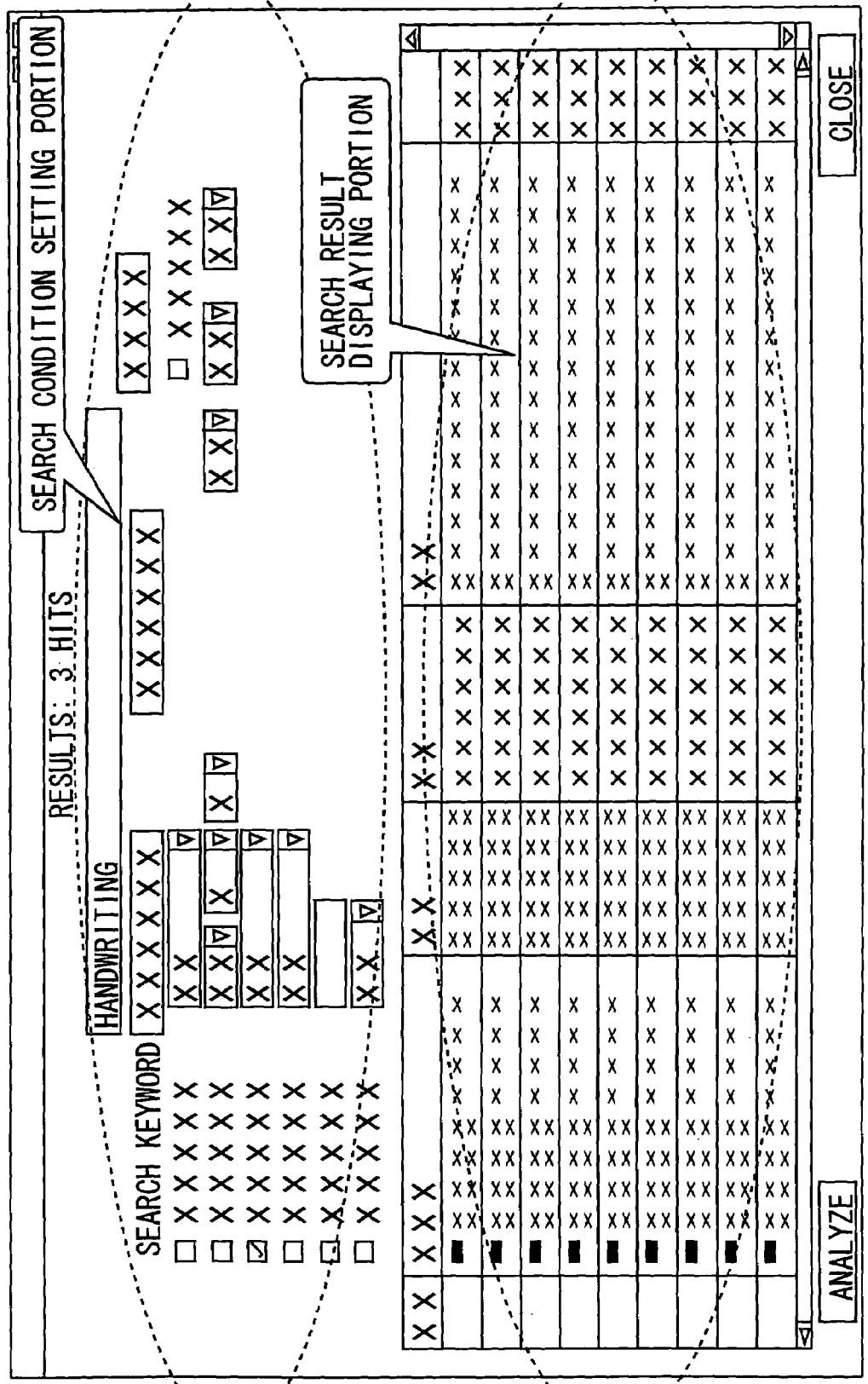
FIG. 18 is a diagram showing an electronic sticky note search dialogue (for teachers).

The navigation bar for a teacher (FIG. 14) also has a search button, which is clicked on to open a search dialogue (FIG. 18). The search dialogue screen is composed of a search condition setting portion and a search result displaying portion. Search conditions are inputted in the search condition setting portion and a start search button is clicked on, causing the script St to notify the electronic sticky note searching unit 55 of the search conditions. The electronic sticky note searching unit 55 extracts, from the electronic sticky note storing unit 52, electronic sticky note data that meets the search conditions out of electronic sticky notes available to the teacher. The search result is displayed in the search result displaying portion of the electronic sticky note search dialogue. For instance, the search condition setting portion is set with <FORM> and <INPUT>, the electronic sticky note searching unit 55 is set as a CGI that has search conditions as argument, and the search result displaying portion is set with TARGET attributes of <FORM>.

Figure 19:
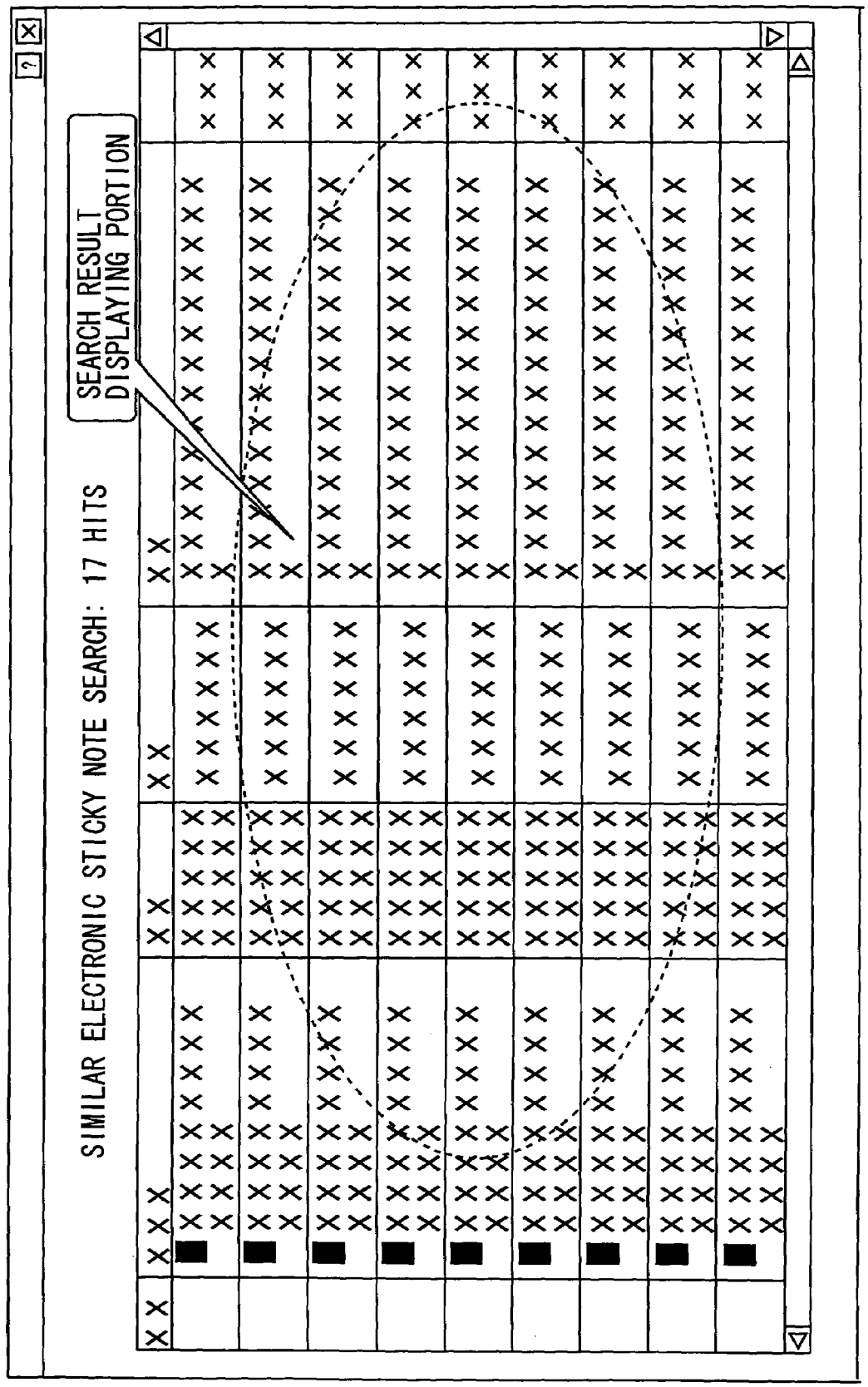
FIG. 19 is a diagram showing a similar electronic sticky note search dialogue.

The search dialogue also has an analysis button, which is clicked on to open the electronic sticky note analysis dialogue enabling the teacher to analyze the electronic sticky notes searched. A click on the similar electronic sticky note search button in the electronic sticky note detail display dialogue opens a similar electronic sticky note search dialogue (FIG. 19). The similar electronic sticky note search dialogue notifies the similar electronic sticky note searching unit 56 of TAG_ID of an electronic sticky note that has been displayed in the electronic sticky note detail display dialogue. The similar electronic sticky note searching unit 56 lists up electronic sticky notes that are similar to the specified electronic sticky note and display the list of the electronic sticky notes in a search result displaying portion of the similar electronic sticky note search dialogue. These functions are readily obtained by, for example, using as the similar electronic sticky note searching unit 56 a CGI that has TAG_ID as argument and that displays a search result in the result displaying portion.

In a similar electronic sticky note search, the similarity between electronic sticky notes is defined, and electronic sticky notes whose similarity exceeds a given threshold are listed up and sorted in an order that places ones with the highest similarity at the top. For example, when an electronic sticky note that is a target of a similarity search is given as $T_A$, the similarity between $T_A$ and an arbitrary electronic sticky note $T_B$ (similarity $S(T_A, T_B)$) is defined by the following expression:

$$S(T_A, T_B) = \frac{N(T_A, T_B) \times (K_A + K_B)}{2 \times K_A \times K_B} \quad \text{Expression 1}$$

wherein $K_A$ and $K_B$ represent the number of keywords stored in TAG_KEYWORD of $T_A$ and $T_B$, respectively, and $N(T_A, T_B)$ is the number of keywords that are common between $T_A$ and $T_B$. Although Expression 1 is for a case of obtaining the similarity from the keyword overlapping ratio alone, the calculation result may be weighted in a manner that raises the similarity when the two electronic sticky notes have the same USER_ID, PAGE_URL, and STANCE. This enables the teacher to search for a past question that highly resembles a current question from a student and to copy and paste the answer to the past question. In the case where many students ask similar questions, the teacher may obtain the corresponding learning material through the terminal 9, use the learning material editing unit 93 to revise and supplement the learning material in a manner that covers the questions of the student, and re-register the learning material in the learning material management server 2. The teacher can open and check a learning material screen to which an electronic sticky note is attached and a detail display dialogue of the electronic sticky note by clicking on the corresponding electronic sticky note data in the list displayed on the similar electronic sticky note display screen.

The electronic sticky note analysis dialogue (FIGS. 20 and 21) can be activated from the analysis button in the same TAG_PATH electronic sticky note list dialogue (FIG. 16) and the analysis button in the search dialogue (FIG. 18) both. Depending on which of the two analysis buttons is used to activate the electronic sticky note analysis dialogue, the electronic sticky note analysis dialogue performs a same TAG_PATH electronic sticky note analysis or a search electronic sticky note analysis through the same processing. The electronic sticky note analysis dialogue corresponds to a condition specifying portion, a result displaying portion and a display specifying portion, and functions as a GUI for performing electronic sticky note analysis processing.

To analyze, an analysis result display format (2D distribution display or tree distribution display) is specified in the display specifying portion, and conditions of electronic sticky notes to be analyzed are specified in the condition specifying portion. Search conditions in the example of FIG. 18 are set such that electronic sticky notes to be analyzed are narrowed down by the contents (STANCE), level of importance (PRIORITY), and creator (TAG_ANNOTATOR) of electronic sticky notes. Using other filtering conditions is possible. In FIG. 18, a check box to the left of a condition is for specifying whether or not this condition is effective in filtering. After analysis conditions and a display format are specified, a start analysis button is clicked on causing the script St to list up electronic sticky notes that meet the conditions out of same TAG_PATH electronic sticky note analysis aggregations or search electronic sticky note analysis aggregations to be analyzed. The script St sends the listed electronic sticky notes as a TAG_ID list to the electronic sticky note analyzing unit 57 in the electronic sticky note management server 5, along with the analysis result display format specified. The electronic sticky note analyzing unit 57 consults the TAG_ID list to fetch corresponding electronic sticky note data from the electronic sticky note storing unit 52. The obtained electronic sticky note data is given as $T_i$ (i=1 through N), and the similarity between $T_i$ and each electronic sticky note data $T_j$ (j=1 through N) out of all other electronic sticky note data is obtained (similarity S ($T_i$, $T_j$), (i≠j)). Processing that follows varies depending on the display format.

In the case where the specified display format is 2D distribution display, the electronic sticky note analyzing unit 57 arranges the electronic sticky notes two-dimensionally in accordance with the similarity S ($T_i$, $T_j$), calculates the two-dimensional coordinates for every electronic sticky note, and sends the coordinates to the electronic sticky note analysis dialogue. To arrange the electronic sticky notes two-dimensionally in accordance with the similarity S ($T_i$, $T_j$), the electronic sticky note analyzing unit 57 first defines an example ideal distance D ($T_i$, $T_j$), an ideal distance value between the electronic sticky notes, by the following expression:

[Expression 2]

$$D(T_A, T_B) = 1 - S(T_A, T_B) \quad \text{Expression 2}$$

Since the codomain of the similarity S ($T_i$, $T_j$) calculated by Expression 1 is [0, 1], the codomain of the ideal distance D ($T_i$, $T_j$) calculated by Expression 2 is also [0, 1]. Assume here that the two-dimensional coordinates of the electronic sticky note $T_i$ are ($x_i$, $y_i$). Then a combination of two-dimensional coordinates that minimize the solution of the following Evaluation Expression E is obtained:

[Expression 3]

$$E = \frac{1}{2} \sum_{i=1}^{N} \sum_{j=1}^{N} \left\{ D(T_i, T_j) - \sqrt{(x_i - x_j)^2 + (y_i - y_j)^2} \right\}^2 \quad \text{Expression 3}$$

E is the mean square error between the ideal distance D ($T_i$, $T_j$) and the actual distance between the electronic sticky notes, and the coordinates that minimize this error are the objective electronic sticky note position. The coordinates ($x_i$, $y_i$) that minimize the solution of Expression 3 can be obtained approximately by simulated annealing which is an application of the spring model, or by min cut which is employed in LSI placement or the like. After the two-dimensional coordinates of the electronic sticky note are calculated, the electronic sticky note analyzing unit 57 sends every TAG_ID and two-dimensional coordinate pairs to the electronic sticky note analysis dialogue, where the script St draws electronic sticky notes in the result displaying portion in accordance with the two-dimensional coordinates.

One look at the two-dimensionally drawn electronic sticky notes and the teacher can intuitively grasp the distribution of the electronic sticky note contents (which electronic sticky notes have high similarity). For instance, when "question" is chosen as the electronic sticky note contents, it is a strong possibility that electronic sticky notes that are in a denser part of the electronic sticky note distribution deal with typical questions which many students wonder about. If the teacher consults some of the electronic sticky notes in such denser parts and adds a new electronic sticky note that can be viewed by all students to solve their questions or revises the corresponding portion of the learning material, a learning material of high educational effect can be obtained.

On the other hand, when the display format specified is tree distribution display, the electronic sticky note analyzing unit 57 creates a binary tree for sorting electronic sticky notes by the similarity S ($T_i$, $T_j$), and sends the configuration of the binary tree created to the electronic sticky note analysis dialogue. Binary tree is a tree configuration that always forks into two branches. In this example, the electronic sticky note analyzing unit 57 creates a binary tree in a manner that places electronic sticky notes having high similarity (≈of close concepts) in the same branch.

In order to create the binary tree, the similarity between aggregations $T_A$ and $T_B$ each containing plural electronic sticky notes (similarity $S^*(T_A, T_B)$) is defined.

$$S^*(T_A, T_B) = \frac{\sum_{T_a \in T_A} \sum_{T_b \in T_B} S(T_a, T_b)}{N_A \times N_B} \quad \text{Expression 4}$$

wherein $N_A$ and $N_B$ represent the number of electronic sticky notes contained in $T_A$ and $T_B$, respectively, and $S(T_a, T_b)$ represents the similarity between the electronic sticky notes (Expression 1). Expression 4 expresses the similarity between two electronic sticky note aggregations by the mean similarity of the electronic sticky notes contained in the two aggregations. Instead, the maximum, or minimum, similarity between the electronic sticky notes contained in the two electronic sticky note aggregations may be taken as the similarity between the two electronic sticky note aggregations.

Figure 22:
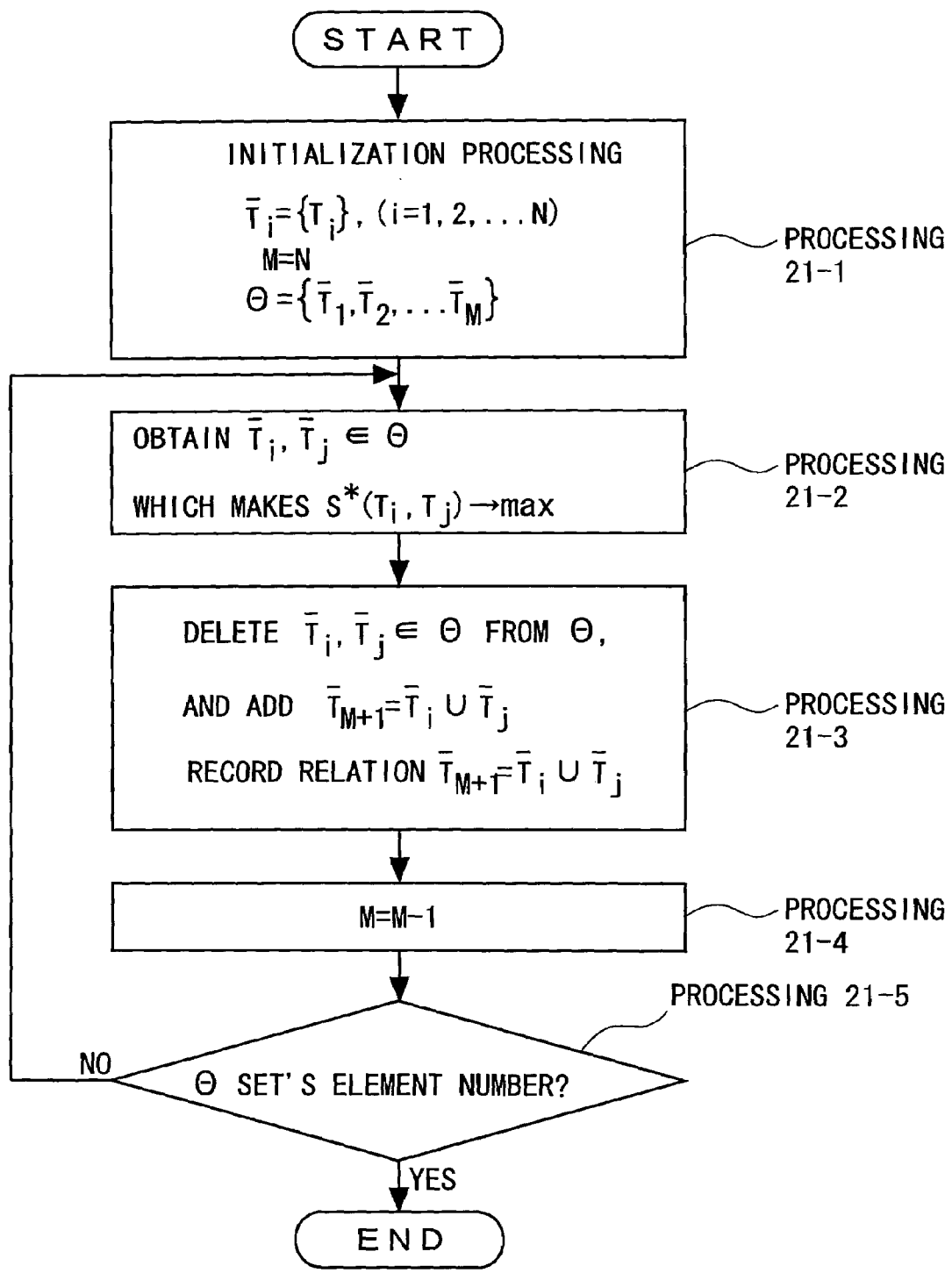
FIG. 22 is a flow chart for creating a binary tree.

FIG. 22 shows the flow of processing of creating a binary tree in accordance with the similarity $S^*(T_A, T_B)$ Processing 21-1 is initialization processing, and has one electronic sticky note aggregation $T_j$ as elements.

N electronic sticky note aggregations $T_j$ are created to create a set Θ which has all the N electronic sticky note aggregations as set elements. Processing 21-2 to Processing 21-5 are repeatedly executed.

Processing 21-2 is processing of determining a pair that has the highest similarity in the set Θ.

Processing 21-3 is processing of combining the obtained highest similarity pair with one electronic sticky note aggregation $T_{m+1}$ and substituting the electronic sticky note aggregation. The substitution relation is recorded as a table shown in FIG. 31, for example.

Processing 21-4 is a suffix operation of the Θ set elements. Processing 21-5 is a termination condition dependent on the number of the Θ set elements. The processing is terminated when all the electronic sticky notes are integrated into one aggregation.

Figure 23:
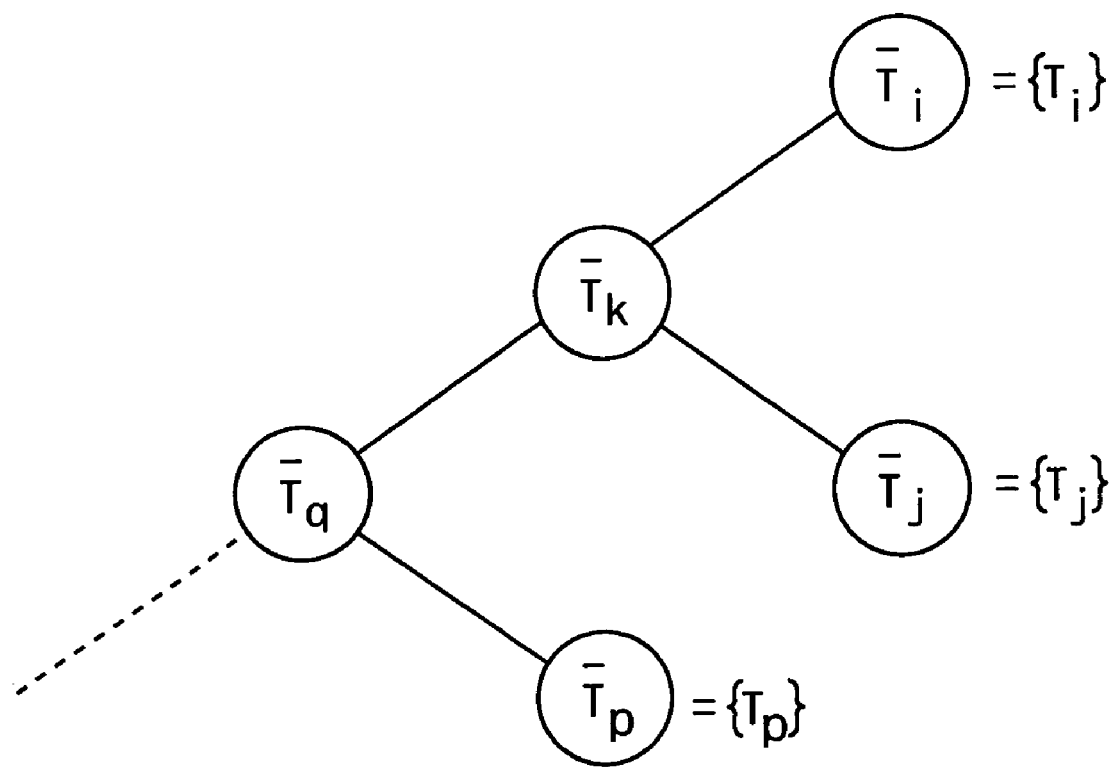
FIG. 23 is an explanatory diagram of (a part of) the created binary tree.

The substitution relation table after the binary tree creating flow is completed shows the configuration of the binary tree. The graph (tree) is drawn such that two electronic sticky note aggregations prior to substitution are branched from an electronic sticky note aggregation after the substitution, thereby turning the table of FIG. 31 into a binary tree of FIG. 23. The electronic sticky note analyzing unit 57 converts the tree configuration created from FIG. 31 into binary tree configuration data of FIG. 32, and sends the data to the electronic sticky note analysis dialogue.

In the electronic sticky note analysis dialogue, the script St draws electronic sticky notes in tree format from the binary tree configuration data in the result displaying portion.

One look at the electronic sticky notes drawn in tree format and the teacher can intuitively grasp how the electronic sticky notes are sorted into groups.

For instance, when "question" is chosen as the electronic sticky note contents, a branch with many electronic sticky notes is likely to hold similar questions. The teacher therefore gives an answer to the similar questions to every student whose electronic sticky note is put on this branch.

Figure 24:
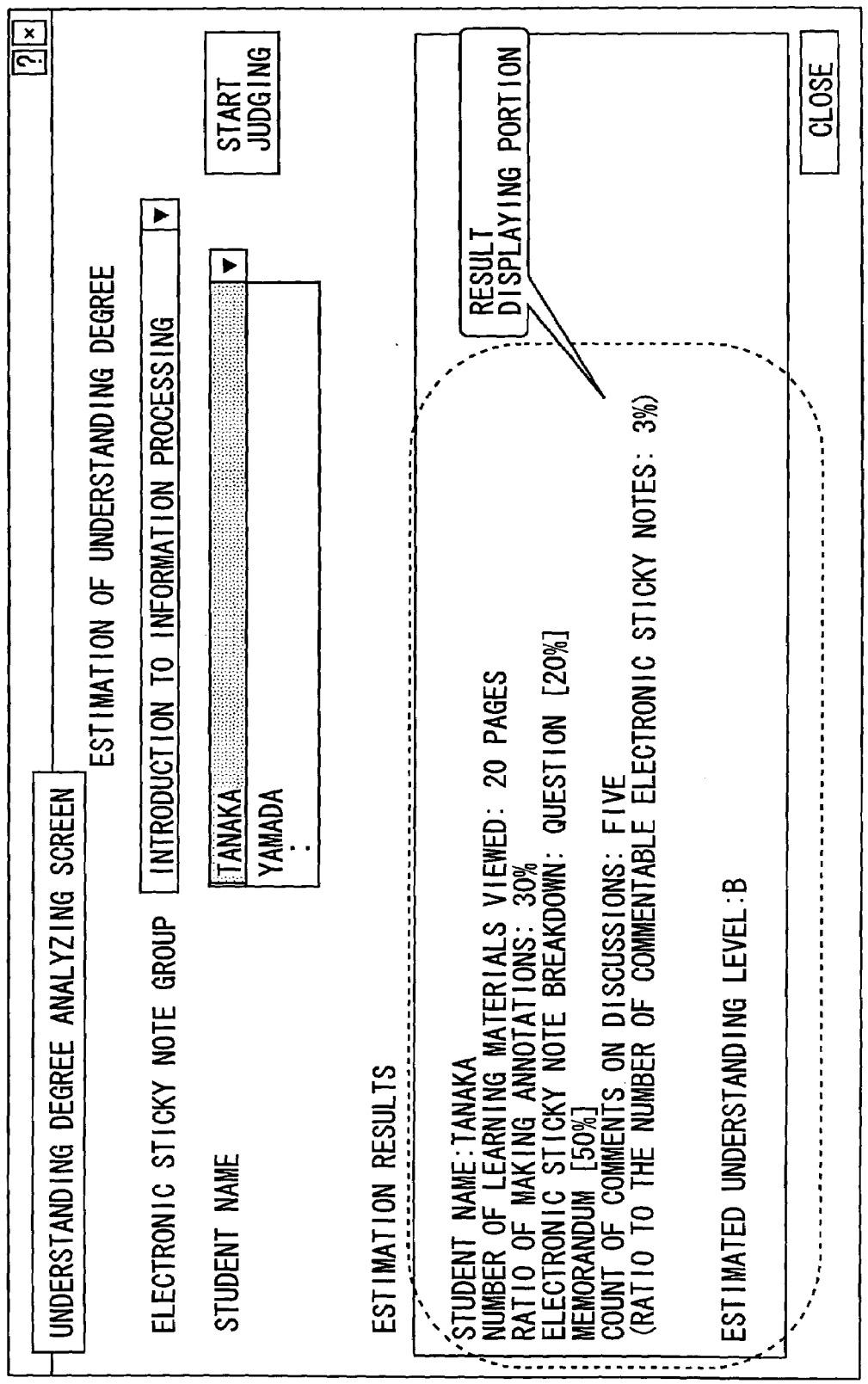
FIG. 24 is a diagram showing an understanding degree estimating screen.

An understanding degree judging screen (FIG. 24) to access the understanding degree judging unit 58 of the electronic sticky note management server 5 is available to the teacher through the teacher terminal 9. The teacher specifies a user group on the understanding degree judging screen to inquire the understanding degree judging unit 58 about the degree of understanding of a specific student. In response to the inquiry, the understanding degree judging unit 58 accesses the electronic sticky note storing unit 52 to fetch electronic sticky notes of the student in the specified electronic sticky note group, and analyzes the trend of the obtained electronic sticky notes. The results of the analysis are displayed in a result displaying portion of the understanding degree judging screen. The trend analysis may include obtaining the number of learning material pages and electronic sticky notes viewed by the student, the ratio of the number of electronic sticky notes to the number of learning materials viewed, the breakdown of STANCE attributes of electronic sticky notes, and how many times the student has commented on electronic sticky notes shared with other students (the frequency with which the student participates in discussions). The degree of understanding of the student is judged based on these facts. For instance, the student's understanding degree can be obtained from an understanding degree judging table (FIG. 33) based on a ratio X at which the student has attached electronic sticky notes to learning materials and a ratio Y at which the student has joined in discussions. The teacher refers to the thus obtained understanding degree judgment to estimate the learning activity of the student.

According to the present invention, a technique is provided which enables users to add annotation information to an electronic document on a network with ease and to share the annotation information within a disclosure range of the annotation information.

INDUSTRIAL APPLICABILITY

As has been described, the present invention can be applied particularly suitably to the field of e-learning, for the present invention provides functions of enabling students and a teacher to share a learning material in the form of electronic document on a network and to ask and answer a question, as well as enabling students to freely write annotations on a learning material, to share and discuss some of such annotations, and to share annotations with a teacher for questions and answers. The present invention also enables a teacher to obtain clues to estimate students' learning progress and degree of understanding, and enables the teacher to create an effective learning material through preparation of an electronic learning material which concentrates on topics that interest students and points that students have difficulties in understanding.

The present invention is also applicable to such uses as group reviewing of a program or a product design.

What is claimde is:

1. An information sharing method comprising causing a computer to execute the steps of:
   providing electronic information in a state that allows attachment of annotation information to the electronic information;
   storing annotation information to be attached to the electronic information in an annotation storing unit;
   storing attribute information indicating a disclosure range of corresponding stored annotation information in an attribute storing unit;
   retrieving and displaying, when a user requests annotation information, the requested annotation information when the user is within the disclosure range of the requested annotation information;
   storing levels of importance for the corresponding stored annotation information;
   storing e-mail addresses of all users who use the computer; and
   sending, when a user of the computer saves annotation information to the annotation storing unit that has a level of importance that is equal to or higher than a predetermined level of importance, an e-mail to users who are within the disclosure range of the saved annotation information.

2. The information sharing method according to claim 1, further comprising:
   storing user identification information of the user who has created the corresponding stored annotation information,
wherein, when a user of the computer adds follow-up annotation information to stored annotation information, the method further comprises:
   retrieving the e-mail address of the user who has created the corresponding stored annotation information; and
   e-mailing either a URL where the follow-up annotation information is stored or the follow-up annotation information itself to the user at the retrieved address.

3. The information sharing method according to claim 1, further comprising:
   creating, at predetermined intervals, summary information of any unviewed annotation information; and
   e-mailing the summary information to a corresponding user.

4. The information sharing method according to claim 1, further comprising:
   providing a mail registration unit,
wherein, when the e-mail is sent and a user of the computer replies with follow-up annotation information, the mail registration unit extracts the follow-up information from the reply and stores the follow-up information in the annotation storing unit with identification information of the corresponding stored annotation information.

5. The information sharing method according to claim 4, wherein the computer has a media management unit that stores multimedia files and, when the reply has a multimedia file attached thereto, the media management unit registers the multimedia file and adds, to the follow-up annotation information, a link to the multimedia file.

6. The information sharing method according to claim 1, further comprising:
   changing, when a user of the computer creates follow-up annotation information having quotation data from the corresponding stored annotation information, the color or luminance of the quoted text or image in the follow-up annotation information.

7. The information sharing method according to claim 1, wherein, when a first user requests annotation information and provides identification information that specifies a second user, the method further comprises:
   extracting stored annotation information created by the second user and available to the first user; and
   providing the extracted annotation information to the first user.

8. The information sharing method according to claim 1, further comprising:

collecting, upon a user's request, all stored annotation information associated with a particular sub-block of the electronic information; and displaying the collected annotation information to the requesting user.

9. The information sharing method according to claim 1, further comprising:
searching the stored annotation information and the corresponding electronic information for keywords.

10. The information sharing method according to claim 1, further comprising:
calculating a similarity between stored annotation information or between groups of stored annotation information; and
displaying the analyzed annotation information in a tree format or in a two-dimensional array based on the calculated similarity.

11. The information sharing method according to claim 1, further comprising:
estimating a user's degree of understanding of electronic information based on annotation data added to the electronic information by the user.

12. An information sharing device comprising:
an information providing unit that provides electronic information in a state that allows attachment of annotation information to the electronic information;
an annotation storing unit that stores annotation information to be attached to the electronic information;
an attribute storing unit that stores attribute information indicating a disclosure range of corresponding stored annotation information;
an annotation management unit that, when a user requests annotation information, retrieves and displays the requested annotation information when the user is within the disclosure range of the requested annotation information; and
a notification unit,
wherein the stored attribute information includes levels of importance for the corresponding stored annotation information,
wherein the attribute storing unit stores e-mail addresses of all users who use the information sharing device, and
wherein, when a user of the information sharing device saves annotation information to the annotation storing unit that has a level of importance that is equal to or higher than a predetermined level of importance, the notification unit sends an e-mail to users who are within the disclosure range of the saved annotation information.

13. The information sharing device according to claim 1, further comprising:
a notification unit,
wherein the stored attribute information includes user identification information of the user who has created the corresponding stored annotation information,
wherein the attribute storing unit stores e-mail addresses of all users who use the information sharing device, and
wherein, when a user of the information sharing device adds follow-up annotation information to stored annotation information, the notification unit retrieves the e-mail address of the user who has created the corresponding stored annotation information and e-mails either a URL where the follow-up annotation information is stored or the follow-up annotation information itself to the user at the retrieved address.

14. The information sharing device according to claim 1, wherein the notification unit creates, at predetermined intervals, summary information of any unviewed annotation information, and e-mails the summary information to a corresponding user.

15. The information sharing device according to claim 1, further comprising:
a mail registration unit,
wherein, when the notification unit sends the e-mail and a user of the information sharing device replies with follow-up annotation information, the mail registration unit extracts the follow-up information from the reply and stores the follow-up information in the annotation storing unit with identification information of the corresponding stored annotation information.

16. The information sharing device according to claim 15, wherein, when the reply has a multimedia file attached thereto, the mail registration unit registers the multimedia file in a media management unit and adds, to the follow-up annotation information, a link to the multimedia file.

17. The information sharing device according to claim 1, wherein, when a user of the information sharing device creates follow-up annotation information having quotation data from the corresponding stored annotation information, the annotation management unit changes the color or luminance of the quoted text or image in the follow-up annotation information.

18. The information sharing device according to claim 1, wherein, when a first user requests annotation information and provides identification information that specifies a second user, the annotation management unit extracts stored annotation information created by the second user and available to the first user, and provides the extracted annotation information to the first user.

19. The information sharing device according to claim 1, further comprising:
an annotation analyzing unit,
wherein, upon a user's request, the annotation analyzing unit collects all stored annotation information associated with a particular sub-block of the electronic information and displays the collected annotation information to the requesting user.

20. The information sharing device according to claim 1, further comprising:
an annotation searching unit that searches the stored annotation information and the corresponding electronic information for keywords.

21. The information sharing device according to claim 1, further comprising:
an annotation analyzing unit that calculates a similarity between stored annotation information or between groups of stored annotation information and displays the analyzed annotation information in a tree format or in a two-dimensional array based on the calculated similarity.

22. The information sharing device according to claim 1, further comprising:
an understanding degree judging unit that estimates a user's degree of understanding of electronic information based on annotation data added to the electronic information by the user.

23. The information sharing device according to claim 1, further comprising an information sharing program for user terminals connected via a network to the information sharing device, wherein the program causes the user terminals to execute the steps of:
requesting the information sharing device to provide electronic information; and displaying the requested electronic information obtained from the information sharing device with corresponding stored annotation information superimposed on the displayed electronic information.

24. A user terminal connected to an information sharing device via a network, comprising:
   an information requesting unit that requests the information sharing device to provide electronic information and annotation information; and
   display means for displaying the requested electronic information obtained from the information sharing device with corresponding annotation information superimposed on the displayed electronic information,
wherein the information sharing device includes:
   an information providing unit that provides electronic information in a state that allows attachment of annotation information to the electronic information;
   an annotation storing unit that stores annotation information to be attached to the electronic information;
   an attribute storing unit that stores attribute information indicating a disclosure range of corresponding stored annotation information;
   an annotation management unit that, when a user requests annotation information, retrieves and displays the requested annotation information when the user is within the disclosure range of the requested annotation information; and
   a notification unit,
wherein the stored attribute information includes levels of importance for the corresponding stored annotation information,
wherein the attribute storing unit stores e-mail addresses of all users who use the information sharing device, and
wherein, when a user of the information sharing device saves annotation information to the annotation storing unit that has a level of importance that is equal to or higher than a predetermined level of importance, the notification unit sends an e-mail to users who are within the disclosure range of the saved annotation information.

25. The user terminal according to claim 24, further comprising:
   an annotation creating unit that creates the stored annotation information,
wherein the created annotation information includes the contents of an annotation, the location where the annotation is to be attached to the electronic information, and the range of disclosure of the annotation; and
   an annotation transmitting unit that sends the created annotation information to the information sharing device.

26. The user terminal according to claim 24, further comprising:
   an annotation creating unit that, when a user of the information sharing device creates follow-up annotation information having quotation data from the corresponding stored annotation information, changes the color or luminance of the quoted text or image in the follow-up annotation information; and
   an annotation transmitting unit that sends the created follow-up annotation information to the information sharing device.

27. An online learning system used by teachers and students comprising an information sharing device, the information sharing device including:
   an information providing unit providing electronic information to students and teachers;
   an annotation storing unit that stores annotation information to be attached to the electronic information;
   an attribute storing unit that stores attribute information indicating a disclosure range of corresponding stored annotation information; and
   an annotation management unit that, when a user requests annotation information, retrieves and displays the requested annotation information when the user is within the disclosure range of the requested annotation information; and
   a notification unit
wherein the stored attribute information includes levels of importance for the corresponding stored annotation information,
wherein the attribute storing unit stores e-mail addresses of all users who use the information sharing device, and
wherein, when a user of the information sharing device saves annotation information to the annotation storing unit that has a level of importance that is equal to or higher than a predetermined level of importance, the notification unit sends an e-mail to users who are within the disclosure range of the saved annotation information.

28. A storage medium that tangibly embodies an information sharing program for causing a computer to execute the steps of:
   providing electronic information in a state that allows attachment of annotation information to the electronic information;
   storing annotation information to be attached to the electronic information in an annotation storing unit;
   storing attribute information indicating a disclosure range of corresponding stored annotation information in an attribute storing unit;
   retrieving and displaying, when a user requests annotation information, the requested annotation information when the user is within the disclosure range of the requested annotation information;
   storing levels of importance for the corresponding stored annotation information;
   storing e-mail addresses of all users who use the computer; and
   sending, when a user of the computer saves annotation information to the annotation storing unit that has a level of importance that is equal to or higher than a predetermined level of importance, an e-mail to users who are within the disclosure range of the saved annotation information.

29. An information sharing system comprising user terminals and an information sharing device for providing the user terminals with electronic information, wherein the information sharing device includes:
   an information providing unit that provides electronic information in a state that allows attachment of annotation information to the electronic information;
   an annotation storing unit that stores annotation information to be attached to the electronic information;
   an attribute storing unit that stores attribute information indicating a disclosure range of corresponding stored annotation information; and
   an annotation management unit that, when a user requests annotation information, retrieves and displays the requested annotation information when the user is within the disclosure range of the requested annotation information; and a notification unit, wherein the stored attribute information includes levels of importance for the corresponding stored annotation information, wherein the attribute storing unit stores e-mail addresses of all users who use the information sharing device, and wherein, when a user of the information sharing device saves annotation information to the annotation storing unit that has a level of importance that is equal to or higher than a predetermined level of importance, the notification unit sends an e-mail to users who are within the disclosure range of the saved annotation information, and wherein the user terminals each have:

an information requesting unit that requests the information sharing device to provide the electronic information and the annotation information; and display means for displaying the requested electronic information obtained from the information sharing device with corresponding stored annotation information superimposed on the displayed electronic information.

* * * * *